United States Patent
Shalabi et al.

(10) Patent No.: US 7,181,462 B2
(45) Date of Patent: Feb. 20, 2007

(54) SYSTEM AND METHOD FOR MULTI SERVER PLACE DATA REPRESENTATION

(75) Inventors: Sami M. Shalabi, Arlington, MA (US);
Mustansir Banatwala, Hudson, NH (US); Joseph A. Russo, Westford, MA (US); Miguel A. Estrada, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 10/454,725

(22) Filed: Jun. 4, 2003

(65) Prior Publication Data

US 2004/0139114 A1    Jul. 15, 2004

Related U.S. Application Data

(63) Continuation-in-part of application No. 10/334,269, filed on Dec. 31, 2002.

(51) Int. Cl.
*G06F 17/30* (2006.01)
*G06F 15/173* (2006.01)

(52) U.S. Cl. ............... 707/102; 707/103 R; 707/104.1; 709/224

(58) Field of Classification Search .................. None
See application file for complete search history.

(56) References Cited

U.S. PATENT DOCUMENTS 6,591,272 B1 * 7/2003 Williams .................... 707/102

2003/0200307 A1 * 10/2003 Raju et al. .................. 709/224

OTHER PUBLICATIONS

Technology Reports, *Project Management XML Schema (PMXML)*, 4 pages, Mar. 9, 2000-Jun. 4, 2002, accessed Jan. 3, 2003 at http://xml.coverpages.org/projectManageSchema.html..

Pacificedge Software Project Office, *Project Management XML Schema*, 1 page, not dated, accessed Jan. 3, 2003 at http://www.webshadow.com/xml..

Pacificedge Software, *<pmxml:ProjectManagementSchema>*, 24 pages, not dated, accessed Jan. 3, 2003 at http://www.webshadow.com/xml/Sample%20MSP%20Publish.xml..

* cited by examiner

*Primary Examiner*—Jeffrey Gaffin
*Assistant Examiner*—Hassan Mahmoudi
(74) *Attorney, Agent, or Firm*—IBM Corporation

(57) ABSTRACT

Data on place objects in a distributed environment are generated in a system including a plurality of server objects instantiated in the environment in the same address domain, which share a same user directory and authentication system, are on a same user network, and are administered by a single administration team. A service catalog is provided for cataloging a plurality of place objects as nodes on a tree, place objects including the plurality of servers objects within the distributed environment. A document file is provided for encapsulating cataloged relationships of server objects in the distributed environment and for storing object attributes generated by traversing the tree.

14 Claims, 11 Drawing Sheets

FIG. 10

| | | | |
|---|---|---|---|
| < > ROOMS | | | ← 881 |
| | ROOMS | | ← 904 |
| | ROOM (3) | | ← 956 |
| | | < >NAME    < >ACCESS | ← 958 |
| | | ↳957 | |
| | | ACCESS | ← 959 |
| | |   MANAGERS | ← 964 |
| | |     MEMBER | ← 965 |
| | |       LINK | ← 966 |
| | |         =ID REF    HAIKUTEAM_PERSON1 | ← 968 |
| | |   AUTHORS ↳967 | ← 969 |
| | 1   MAIN.NSF |     MEMBER | ← 970 |
| | |       LINK | ← 971 |
| | |         =ID REF    HAIKUTEAM_PERSON2 | ← 972 |
| | |   READERS ↳960 | ← 973 |
| | 961 |     MEMBER | ← 974 |
| | |       LINK | ← 975 |
| | |         =ID REF    HAIKUTEAM_GROUP1 | ← 976 |
| | | ACCESS ↳911 | ← 977 |
| | |   MANAGERS | ← 979 |
| | |     MEMBER | ← 980 |
| | |       LINK | ← 981 |
| | |         =ID REF    HAIKUTEAM_PERSON2 | ← 983 |
| | 2   PAGE LIBRARY. NSF |   AUTHORS ↳913 | ← 984 |
| | |     MEMBER | ← 985 |
| | |       LINK | ← 986 |
| | |         =ID REF    HAIKUTEAM_PERSON1 | ← 988 |
| | |   READERS ↳906 | ← 989 |
| | 962 |     MEMBER | ← 987 |
| | |       LINK | ← 990 |
| | |         =ID REF    HAIKUTEAM_GROUP1 | ← 991 |
| | | ACCESS ↳912 | ← 978 |
| | |   MANAGERS | ← 992 |
| | |     MEMBER | ← 993 |
| | |       LINK | ← 994 |
| | |         =ID REF    HAIKUTEAM_PERSON1 | ← 995 |
| | 3   PAGE LIBRARY2. NSF |   AUTHORS ↳914 | ← 996 |
| | |     MEMBER | ← 997 |
| | |       LINK | ← 998 |
| | |         =ID REF    HAIKUTEAM_GROUP1 | ← 999 |
| | |   READERS ↳916 | ← 1001 |
| | 963 |     MEMBER | ← 1002 |
| | |       LINK | ← 1003 |
| | |         =ID REF    HAIKUTEAM_PERSON1 | ← 1004 |
| | | ↳905 | |

FIG. 11

SYSTEM AND METHOD FOR MULTI SERVER PLACE DATA REPRESENTATION

CROSS REFERENCES TO RELATED APPLICATIONS

This application claims priority under 35 U.S.C. § 120 as a continuation-in-part application of related U.S. patent application Ser. No. 10/334,269, filed 31 Dec. 2002, entitled "System and Method for the Aggregation of Place Information in a Multi-Server System".

U.S. patent application Ser. No. 10/454,301, filed 4 Jun. 2003, entitled "System and Method For Invoking Methods on Place Objects In a Distributed Environment", is assigned to the same assignee hereof and contains subject matter related, in certain respect, to the subject matter of the present application. The above identified patent applications are incorporated herein by reference.

BACKGROUND OF THE INVENTION

1. Technical Field of the Invention

This invention relates to data processing in a distributed environment. More particularly, to a system and method for cataloging and traversing a plurality place objects within a distributed environment selectively to execute methods on said place objects, acquire data from said place objects for generating reports, and export that data into another distributed environment.

2. Background Art

IBM Lotus Domino™ applications let people share, collect, track, and organize information, using Lotus Notes™ or the Web. Domino applications can cover a wide range of business solutions, including: workflow, tracking, collaboration, data integration, personalization, and globalization. Every Domino application contains one or more Domino databases. A Domino database is a container for the data, logic, and design elements in an application, and include: pages, forms, outlines, navigators, views, folders, framesets, shared resources, and agents. A page is a database design element that displays information. Forms, like pages, display information and can be used to collect information. Fields are the elements that collect data. A view is a sorted or categorized list of documents. A folder is a container that stores documents. An outline is a navigation tool created to customize a folder pane of an application. Navigators are graphical road maps that direct users to specific parts of a database, allowing users to find documents or take actions without having to open views. A frameset is a collection of independently scrollable frames. Agents are programs that perform a series of automated tasks according to a set schedule or at the request of a user. Shared resources are resources maintained in one standard place for use throughout the application, and include: image resources, shared fields, subforms, script libraries, shared Java files, and shared actions. Domino applications support collaboration, in which the unit of collaboration is a database.

Heretofore in IBM QuickPlace™ the unit of collaboration is a place which is a group of databases that reside on a single server. QuickPlace is implemented with an object model that includes four primary objects, including a (1) place that has (2) rooms which include (3) pages. And then there are (4) members of the place. Pages are organized within folders. Forms and fields are two further objects primarily visible to the designer of the place.

Place type is an object from which a place is created. Place type represents the foundation for building collaborative applications. Everything created in building collaboration space is done in a place. Once such a place is created, it can be made a template and copied as a place type. Once it becomes a place type, it is available for use by others for building additional places that include the format, look and feel, and other characteristics of the original place.

Other QuickPlace objects are skins and PlaceBots. Skins control everything about the user interface, including layout and style. Layout defines the positioning of components on the screen. Style defines the form and colors of those components. A PlaceBot is an enhanced agent, enhanced in the sense that it enables the use of Java or Lotus Notes or equivalent text editors. Once a PlaceBot is written using such an editor, and uploaded to a place, the server compiles the PlaceBot into an agent, reporting any errors. The agent resulting from a compiled PlaceBot can be scheduled to run at certain times, or upon opening a form. That is, the PlaceBot may be associated with a form, such as a sales order which, when opened, will cause the agent to execute. Thus, PlaceBots are the primary repository for custom logic in QuickPlace collaboration applications.

QuickPlace objects and equivalent Domino objects include the following: QuickPlace Server is equivalent to a Domino File Directory; Place to a File Directory; Page to a Data Note, Form & Subform; PlaceBot to a Domino Agent; Theme to a Data Note; Member to a Data Note in Contacts1.nsf; Subroom to a NSF Database; SubroomTheme to a Data Note; SubroomMember to a Data Note in Contacts1.nsf; Room to a NSF Database; Folder/TOC to a Folder or View; Form to a Data Note; and Field to a Data Note. Subrooms contain their own set of Folder, Page, Form, Field, PlaceBot & Subroom Objects.

In QuickPlace, version 1, administration was managed in server islands. It was not possible to get an overview of the QuickPlaces deployment in a large organization, and administration done in a large (many servers) deployment was tedious in that each server had to be managed individually without being able to generate reports that give the state of a plurality of places in an entire organization.

Programmatic administration of applications is known in, for example, a Domino environment. However, these do not understand the notion of QuickPlaces and the kinds of data relevant to such places, such as size, address, membership, last access, last modified, how distributed on servers, how places can be addressed through a URL, and ability to add meta data to each instance of the places (such as cost center, and other such user defined data).

There is a need to provide for scaling of the above QuickPlace collaboration model in several ways: 1) resource scalability, such as disk space, CPU, etc.; 2) geography scalability—which would allow deployments of places in different locations; and 3) administration scalability, with a multi-server unit of administration rather than having to administer a plurality of servers.

Domino, IBM, the IBM Logo, Lotus, Notes, QuickPlace are trademarks of International Business Machines in the United States, other countries, or both.

SUMMARY OF THE INVENTION

It is an object of the invention to provide a system and method for managing data and methods on a plurality of objects in a distributed environment.

In accordance with the present invention there is provided a system, method, and computer program product for representing data on place objects in a distributed environment by instantiating a plurality of servers in the environment;

instantiating a service catalog to include indicia cataloging a plurality of place objects as nodes on a tree including the plurality of servers within the distributed environment; generating from the service catalog a document file encapsulating cataloged relationships of server objects in the distributed environment; traversing the tree to generate from the place objects a document file of object attributes; and generating from the document file reports including the object attributes.

Other features and advantages of this invention will become apparent from the following detailed description of the presently preferred embodiment of the invention, taken in conjunction with the accompanying drawings.

BRIEF DESCRIPTION OF THE DRAWINGS

FIG. 10 is a graphical visualization in greater depth of a second members object in the XML of FIG. 8.

FIG. 11 is a graphical visualization in greater depth of a rooms object in the XML of FIG. 8.

BEST MODE FOR CARRYING OUT THE INVENTION

A QuickPlace service is a multi-server deployment of QuickPlace servers that can be treated as a consistent unit of service for administration and in the user interface.

A QuickPlace service comprises multiple QuickPlace servers and/or QuickPlace clusters, which: (1) are in the same Domino domain; (2) share the same user directory and authentication system; (3) are on the same user network (i.e., are not separated by a firewall); and (4) are administered by the same administration team.

These constraints are enough to ensure across the service that: (1) servers can be configured consistently; (2) servers can communicate and share data with each other; (3) user identities are in the same name space and do not collide; and (4) single sign on authentication can be implemented.

A QuickPlace cluster is treated as a single virtual server in the service model.

Figure 1:
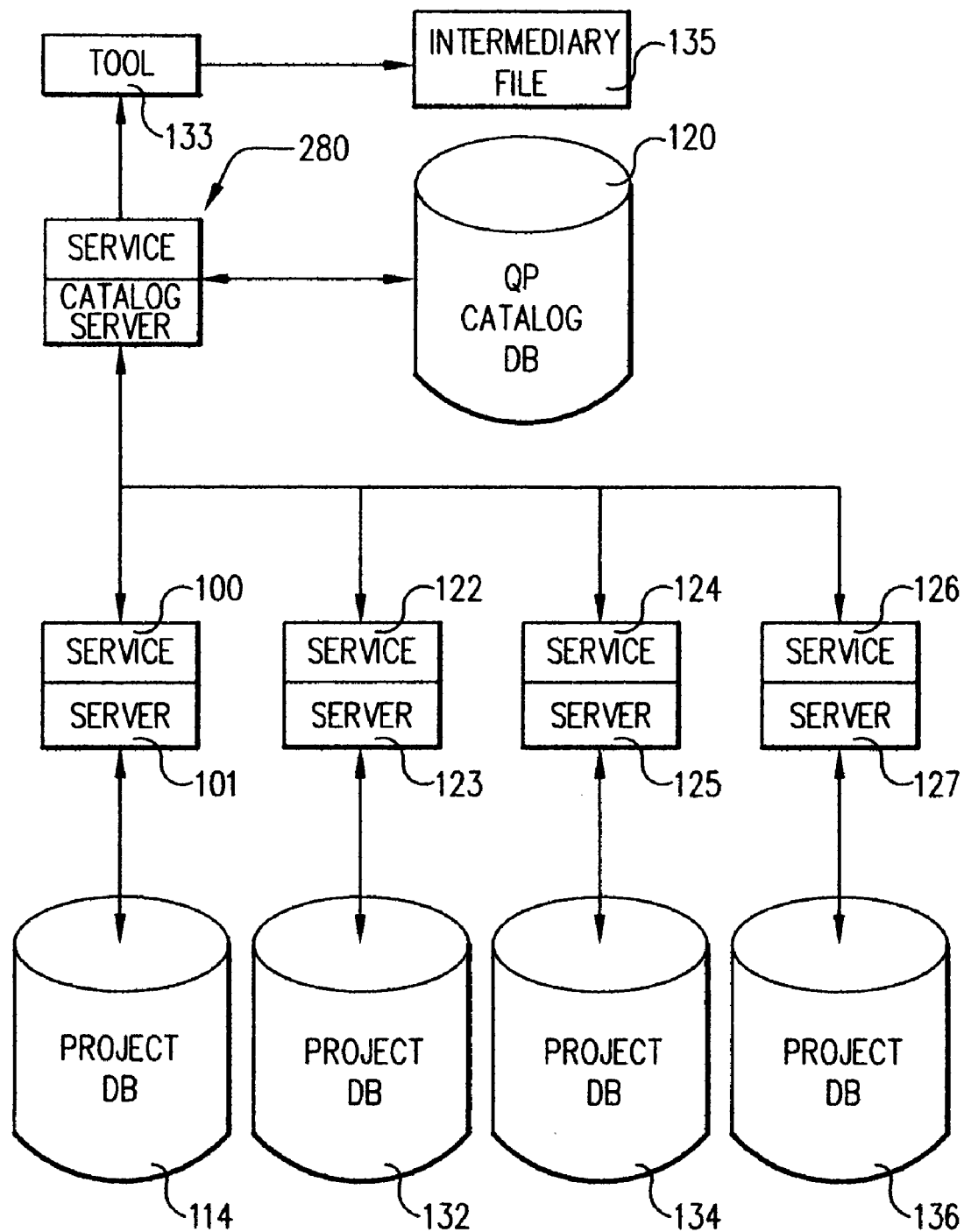
FIG. 1 is a system diagram illustrating an exemplary multi-server environment.

Referring to FIG. 1, catalog 120 is a database, such as a QuickPlace catalog, for aggregating information about projects, such as QuickPlaces 114, 132, 134, 136, in a multi-server system environment, including service 100/server 101, 122/123, 124/125, and 126/127. Host catalog server 280 is a Domino server with QuickPlace installed which has been configured to host catalog database 120 and which is accessible to QuickPlace servers 101, 123, 125 and 127 within a given service. Import/export tool 133 generates in intermediary file 135 a document containing a XML data representation of all places 114, 132 in a particular service, for example, 100/122. An example is the XML of Table 2. Document 135 is used, inter alia, to generate reports and to receive data exported from one service for importing into another service.

Throughout this specification, the generic term "project" and more specific terms "place" or "QuickPlace" are used substantially interchangeably. Place and QuickPlace are specific examples of projects.

Object Model

An object model is a collection of related objects. An object is a type of programming entity together with the properties of the entity and methods that perform actions on that entity.

A containment model provides a view of relationships of objects, and in effect culls out of an object model the specific relationships of its objects. Thus, a containment model specifies which objects hold other objects.

An inheritance model is a programming concept, or model, that illustrates how objects inherit. In object-oriented programming, subclasses (objects) inherit the non-private variables and methods of all their superclasses. That is, an object implicitly contains all the non-private variables of its superclass, and can invoke all the non-private methods of its superclass.

In accordance with the exemplary embodiment based on a QuickPlace environment, all object representations adhere to the QuickPlace Object DTD of Table 1.

A Document Type Definition (DTD) is written in a formal syntax that explains precisely which elements and entities may appear in a document and the elements' contents and attributes. Validating parsers compare document to their DTDs and list places where the document differs from constraints specified in the DTD. The program can then decide what it wants to do about violations. Validation is an optional step in processing XML.

TABLE 1

DOCUMENT TYPE DEFINITION (DTD)

```
1  <?xml version="1.0" encoding="UTF-8"?>
2  <!ELEMENT service (servers?)*>
3  <!ELEMENT servers (server*)*>
4  <!ELEMENT server (name? | hostname? | port? | protocol? |
5  path_prefix? | placetypes? | places?)*>
6  <!ATTLIST server
7     id ID #IMPLIED
8     local (false | true) #IMPLIED
9     action CDATA #IMPLIED
10 >
11 <!ELEMENT placetypes (placetype*)*>
12 <!ELEMENT placetype (((name? | description? |
13 additional_information_url?)* | link))>
```

TABLE 1-continued

DOCUMENT TYPE DEFINITION (DTD)

```
14  <!ATTLIST placetype
15      id ID #IMPLIED
16      action CDATA #IMPLIED
17  >
18  <!ELEMENT places (place*)*>
19  <!ELEMENT place (name? | placetype? | title? | members? | rooms?
20  | archive_directory? | lock_message? | last_accessed? |
21  last_modified? | size? | meta_data?)*>
22  <!ATTLIST place
23      id ID #IMPLIED
24      locked (false | true) #IMPLIED
25      action CDATA #IMPLIED
26  >
27  <!ELEMENT person (((dn?)* | (username? | password? | email? |
28  first_name? | last_name?)*) | description? | offline_password? |
29  theme?)*>
30  <!ATTLIST person
31      id ID #IMPLIED
32      local (false | true) #IMPLIED
33      action CDATA #IMPLIED
34      subscribed_to_newsletter (true | false) #IMPLIED
35      using_accessible_ui (false | true) #IMPLIED
36      subscribed_to_calendar_events (true | false) #IMPLIED
37      email_client (notes5 | notes6 | outlook | ical | other)
38  #IMPLIED
39  >
40  <!ELEMENT group (((dn?)* | (username?)* | username?) |
41  description?)*>
42  <!ATTLIST group
43      id ID #IMPLIED
44      local (false | true) #IMPLIED
45      action CDATA #IMPLIED
46  >
47  <!ELEMENT rooms (room*)*>
48  <!ELEMENT room (name? | access?)*>
49  <!ATTLIST room
50      id ID #IMPLIED
51      action CDATA #IMPLIED
52  >
53  <!ELEMENT access (managers? | authors? | readers?)*>
54  <!ELEMENT managers (member*)*>
55  <!ELEMENT readers (member*)*>
56  <!ELEMENT authors (member*)*>
57  <!ELEMENT members (person* | group*)*>
58  <!ELEMENT member (link?)*>
59  <!ATTLIST member
60      action CDATA #IMPLIED
61  >
62  <!ELEMENT meta_data ANY>
63  <!ATTLIST meta_data
64      action CDATA #IMPLIED
65  >
66  <!ATTLIST link
67      idref IDREF #REQUIRED
68  >
69  <!ELEMENT protocol (#PCDATA)>
70  <!ELEMENT path_prefix (#PCDATA)>
71  <!ELEMENT port (#PCDATA)>
72  <!ELEMENT hostname (#PCDATA)>
73  <!ELEMENT name (#PCDATA)>
74  <!ELEMENT password (#PCDATA)>
75  <!ELEMENT archive_directory (#PCDATA)>
76  <!ELEMENT offline_password (#PCDATA)>
77  <!ELEMENT title (#PCDATA)>
78  <!ELEMENT theme (#PCDATA)>
79  <!ELEMENT username (#PCDATA)>
80  <!ELEMENT description (#PCDATA)>
81  <!ELEMENT additional_information_url (#PCDATA)>
82  <!ELEMENT dn (#PCDATA)>
83  <!ELEMENT email (#PCDATA)>
84  <!ELEMENT size (#PCDATA)>
85  <!ELEMENT lock_message (#PCDATA)>
86  <!ELEMENT first_name (#PCDATA)>
87  <!ELEMENT last_name (#PCDATA)>
88  <!ELEMENT last_accessed (#PCDATA)>
89  <!ELEMENT last_modified (#PCDATA)>
90  <!ELEMENT link EMPTY>
```

In the DTD of Table 1,
UTF-8 is the character set
| represents logical "OR"
? permits zero or one of the element
<! > are the comment delimiters
* permits zero or more of the element
+ permits one or more of the element
implied means optional
required means required
dn is the a distinguished name
ui is a user interface
id is an identifier which is unique in the entire file
PCDATA element may contain only parsed character data, and may not contain child elements of any type
CDATA element can contain any string of text acceptable in a well-formed XML attribute value Table 2 presents an XML document describing a particular configuration of objects in database 114 forming a project, or QuickPlace. In this case, the XML tree of lines 3–5 allows the building of a tree that illustrates the entire organization across a plurality of servers 101 in a service, or distributed environment. The terms "places" and "servers" provide a level of indirection that encapsulates groups of the same type. For example, "servers" encapsulates a group of individual servers, making it easier to treat them as a unit.

TABLE 2

XML PLACE DATA EXAMPLE

```
1   <?xml version="1.0" encoding="UTF-8" ?>
2   <!DOCTYPE service (View Source for full doctype . . .)>
3   - <service>
4     - <servers>
5       - <server>
6           <name>corn/Haiku</name>
7           <hostname>corn.iris.com</hostname>
8           <port>80</port>
9       - <placetypes>
10          - <placetype id="placetype1">
11              <name>pt1</name>
12              <description>The best PlaceType ever</description>
13              <additional_information_url>http://www.lotus.com
14              /qpdevzone</additional_information_url>
15          </placetype>
16        </placetypes>
17      - <places>
18        - <place>
19            <name>haikuteam</name>
20            <title>QuickPlace Team Place</title>
21          - <members>
22            - <person id="haikuteam_person1">
23                <username>sami</username>
24                <password>password</password>
25                <first_name>Sami</first_name>
26                <last_name>Shalabi</last_name>
27            </person>
28            - <person id="haikuteam_person2">
29                <dn>cn=Sami Shalabi,ou=Westford,o=IBM</
                    dn>
30            </person>
31            - <group id="haikuteam_group1">
32                <dn>cn=QPCore</dn>
33            </group>
34          </members>
35        - <rooms>
36          - <room>
37              <name>Main.nsf</name>
38            - <access>
39              - <managers>
```

TABLE 2-continued

XML PLACE DATA EXAMPLE

| | |
|---|---|
| 40 |     - <member> |
| 41 |         <link idref="haikuteam_person1" /> |
| 42 |     </member> |
| 43 |   </managers> |
| 44 |   - <authors> |
| 45 |     - <member> |
| 46 |         <link idref="haikuteam_person2" /> |
| 47 |     </member> |
| 48 |   </authors> |
| 49 |   - <readers> |
| 50 |     - <member> |
| 51 |         <link idref="haikuteam_group1" /> |
| 52 |     </member> |
| 53 |   </readers> |
| 54 | </access> |
| 55 | </room> |
| 56 | - <room> |
| 57 |   <name>PageLibrary.nsf</name> |
| 58 |   - <access> |
| 59 |     - <managers> |
| 60 |       - <member> |
| 61 |         <link idref="haikuteam_person2" /> |
| 62 |       </member> |
| 63 |     </managers> |
| 64 |     - <authors> |
| 65 |       - <member> |
| 66 |         <link idref="haikuteam_person1" /> |
| 67 |       </member> |
| 68 |     </authors> |
| 69 |     - <readers> |
| 70 |       - <member> |
| 71 |         <link idref="haikuteam_group1" /> |
| 72 |       </member> |
| 73 |     </readers> |
| 74 |   </access> |
| 75 | </room> |
| 76 | - <room> |
| 77 |   <name>PageLibrary2.nsf</name> |
| 78 |   - <access> |
| 79 |     - <managers> |
| 80 |       - <member> |
| 81 |         <link idref="haikuteam_person1" /> |
| 82 |       </member> |
| 83 |     </managers> |
| 84 |     - <authors> |
| 85 |       - <member> |
| 86 |         <link idref="haikuteam_group1" /> |
| 87 |       </member> |
| 88 |     </authors> |
| 89 |     - <readers> |
| 90 |       - <member> |
| 91 |         <link idref="haikuteam_person1" /> |
| 92 |       </member> |
| 93 |     </readers> |
| 94 |   </access> |
| 95 | </room> |
| 96 | </rooms> |
| 97 | </place> |
| 98 | - <place> |
| 99 |   <name>performance</name> |
| 100 |   <title>QuickPlace Performance Place</title> |
| 101 |   - <members> |
| 102 |     - <person id="performance_person1"> |
| 103 |       <dn>cn=Sami Shalabi,ou=Westford,o=IBM</dn> |
| 104 |     </person> |
| 105 |     - <person id="performance_person2"> |
| 106 |       <dn>cn=Miguel Estrada,ou=Westford,o=IBM</dn> |
| 107 |     </person> |
| 108 |     - <group id="performance_group1"> |
| 109 |       <dn>cn=QPCore</dn> |
| 110 |     </group> |
| 111 |   </members> |
| 112 |   - <rooms> |
| 113 |     - <room> |
| 114 |       <name>Main.nsf</name> |
| 115 |       - <access> |
| 116 |         - <managers> |
| 117 |           - <member> |
| 118 |             <link idref="performance_person1" /> |
| 119 |           </member> |
| 120 |         </managers> |
| 121 |         - <authors> |
| 122 |           - <member> |
| 123 |             <link idref="performance_person2" /> |
| 124 |           </member> |
| 125 |         </authors> |
| 126 |         - <readers> |
| 127 |           - <member> |
| 128 |             <link idref="performance_group1" /> |
| 129 |           </member> |
| 130 |         </readers> |
| 131 |         </access> |
| 132 |       </room> |
| 133 |     </rooms> |
| 134 |   </place> |
| 135 | </places> |
| 136 | </server> |
| 137 | - <server> |
| 138 |   <name>rye/Haiku</name> |
| 139 |   <hostname>rye.iris.com</hostname> |
| 140 |   <port>80</port> |
| 141 |   - <placetypes> |
| 142 |     - <placetype> |
| 143 |       <name>pt1</name> |
| 144 |       <description>The best PlaceType ever</description> |
| 145 |       <additional_information_url>http:// |
| 146 |       www.lotus.com/qpdevzone |
| 147 |       </additional_information_url> |
| 148 |     </placetype> |
| 149 |   </placetypes> |
| 150 |   - <places> |
| 151 |     - <place> |
| 152 |       <name>haikuteam</name> |
| 153 |       <title>QuickPlace Team Place</title> |
| 154 |       - <members> |
| 155 |         - <person id="haikuteam_person1_1"> |
| 156 |           <username>sami</username> |
| 157 |           <password>password</password> |
| 158 |           <first_name>Sami</first_name> |
| 159 |           <last_name>Shalabi</last_name> |
| 160 |         </person> |
| 161 |         - <person id="haikuteam_person2_1"> |
| 162 |           <dn>cn=Sami Shalabi,ou=Westford,o=IBM</dn> |
| 163 |         </person> |
| 164 |         - <group id="haikuteam_group1_1"> |
| 165 |           <dn>cn=QPCore</dn> |
| 166 |         </group> |
| 167 |       </members> |
| 168 |       - <rooms> |
| 169 |         - <room> |
| 170 |           <name>Main.nsf</name> |
| 171 |           - <access> |
| 172 |             - <managers> |
| 173 |               - <member> |
| 174 |                 <link idref="haikuteam_person1" /> |
| 175 |               </member> |
| 176 |             </managers> |
| 177 |             - <authors> |
| 178 |               - <member> |
| 179 |                 <link idref="haikuteam_person2" /> |
| 180 |               </member> |
| 181 |             </authors> |
| 182 |             - <readers> |
| 183 |               - <member> |
| 184 |                 <link idref="haikuteam_group1" /> |
| 185 |               </member> |
| 186 |             </readers> |
| 187 |           </access> |
| 188 |         </room> |
| 189 |       </rooms> |
| 190 |     </place> |

TABLE 2-continued

XML PLACE DATA EXAMPLE

```
192        - <place>
193            <name>performance</name>
194            <title>QuickPlace Performance Place</title>
195            - <members>
196                - <person id="performance_person1_1">
197                    <dn>cn=Sami Shalabi,ou=Westford,o=IBM</dn>
198                </person>
199                - <person id="performance_person2_1">
200                    <dn>cn=Miguel Estrada,ou=Westford,o=IBM</dn>
201                </person>
202                - <group id="performance_group1_1">
203                    <dn>cn=QPCore</dn>
204                </group>
205            </members>
206            - <rooms>
207                - <room>
208                    <name>Main.nsf</name>
209                    - <access>
210                        - <managers>
211                            - <member>
212                                <link idref="performance_person1_1" />
213                            </member>
214                        </managers>
215                        - <authors>
216                            - <member>
217                                <link idref="performance_person2_1" />
218                            </member>
219                        </authors>
220                        - <readers>
221                            - <member>
222                                <link idref="performance_group1_1" />
223                            </member>
224                        </readers>
225                    </access>
226                </room>
227            </rooms>
228        </place>
229    </places>
230 </server>
231 </servers>
232 </service>
```

Figure 2:
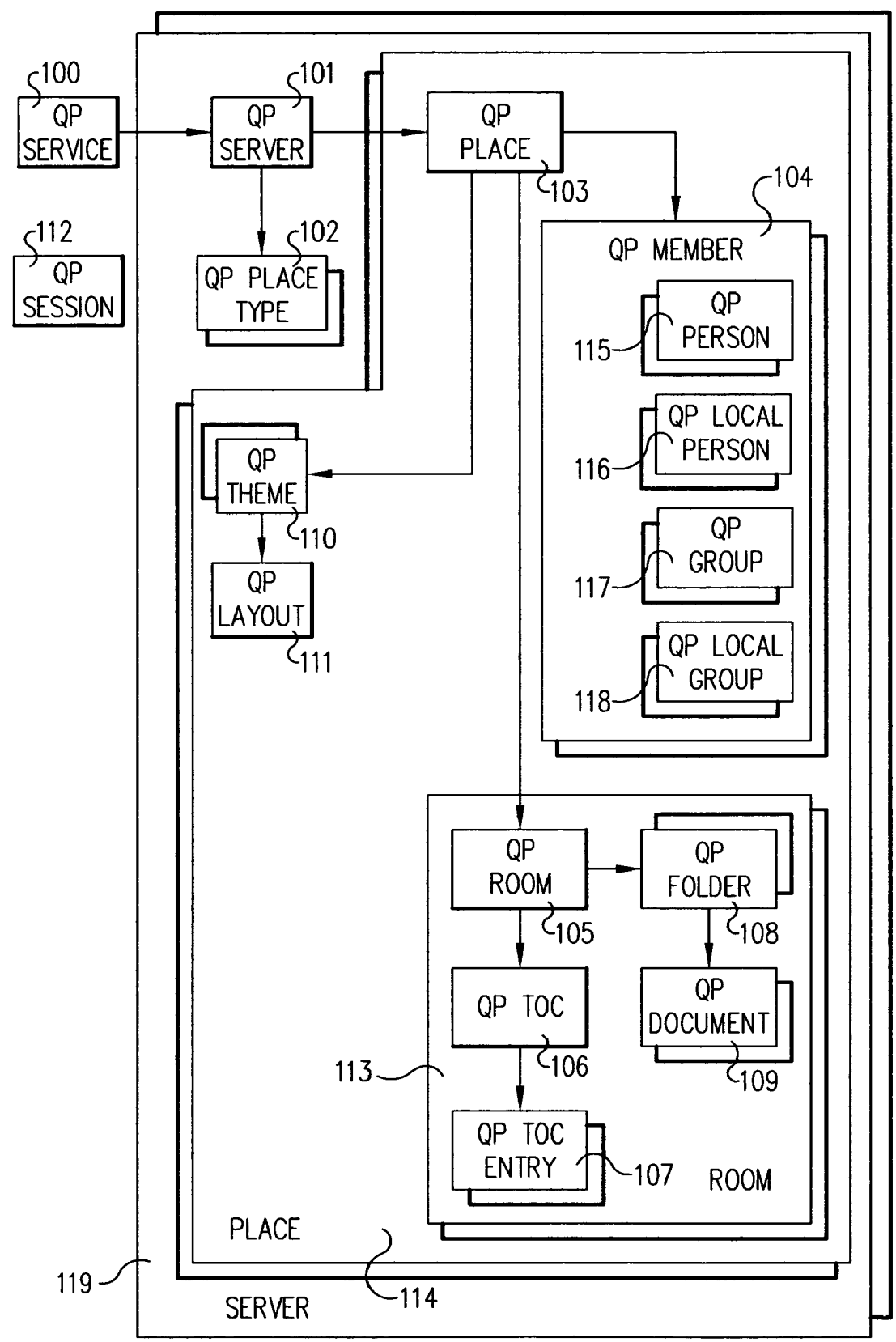
FIG. 2 is a first diagrammatic illustration of the object model of the preferred embodiment of the invention presented as a containment model showing the relationships of objects within the model.

Referring to FIG. 2, a high level containment model representation of an exemplary embodiment of the invention is presented. Each box represents a unit that can be manipulated and used to retrieve and store data. Each object has several associated methods.

QP service 100 represents the service. A service is an object that signifies a group of servers in an organization. There is one instance of a service 100 for any group of servers comprising a distributed environment. Thus, a QuickPlace service is a multi-server deployment of QuickPlace servers that can be treated as a consistent unit of service for administration and in the user interface.

A QuickPlace service comprises multiple QuickPlace servers and/or QuickPlace clusters, which: (1) are in the same Domino domain; (2) share the same user directory and authentication system; (3) are on the same user network (i.e., are not separated by a firewall); and (4) are administered by the same administration team.

These constraints are enough to ensure across the service that: (1) servers can be configured consistently; (2) servers can communicate and share data with each other; (3) user identities are in the same name space and do not collide; and (4) single sign on authentication can be implemented.

A QuickPlace cluster is treated as a single virtual server in the service model.

Server 101 represents a physical or virtual server entity that is addressable and may contain a group of places 103 and place types 102.

Place 103 is an object that represents a place or project. This is the entry point into a particular project and all its data and all its manipulations—including logical methods such as lock, remove, member, and so forth.

QP members 104 represents members of place 114. There are many kinds of members, including person 115, local person 116, group 117 and local group 118. Members 104 are the seed of any membership operation done in the place 114. Each member 114 has an associated identity and profile. Member classes 115–118 map to classes 465–469, respectively, of FIG. 5.

Room 105 represents a room 113 within a project 114.

In an exemplary embodiment, a project is a place, which is content and membership associated with that content.

A room 105 controls access to a subset of the data in the project 114, including table of contents (TOC) 106, and folders 108.

TOC 106 represents the table of contents of a room 113, which is composed of many TOC entries 107, which TOC entry includes a url to a content and the associated type (folder, room, document, etc.) of that content.

Folder 108 contains many documents 109, and each room 113 can contain many folders 108.

Documents 109 represent documents in a place 114.

Each place 114 may contain many themes 110. A theme is an object that represents how to lay out the user interface for this project, and how to brand the user interface.

Layout 111 specifies one of the ways a theme 110 is laid out. Associated with each theme 110 there may be several layouts.

Session 112 is a session needed to work with this object model. It provides for associating an identity with any manipulation. For example, if when creating a place 114 on a server 119, session 112 represents the identity of the individual. If that individual does not have authorization to create a place 114, an error will be received.

Rooms 113 represent multiple rooms in a place 114.

Places 114 represents multiple places on a server 119.

Each object is able to represent itself as xml and recreate itself from the exported xml. Collectively, as will be apparent from context, the service, server, place, placetype, member, room, and document objects may be referred to as "place objects".

Service Object 100

Service object, or node, 100 represents a container for one or more servers 119 that comprise the QuickPlace service. Servers that are part of a service can be manipulated with the following actions:

query
getPlaces
getServers
search

<Query> queries QuickPlace service 100 for specific data. By providing a query capability at the service level, the administrator is able to retrieve specific information from one or more QuickPlaces 114 that are part of the service 100. Table 3 gives the syntax for the query action.

TABLE 3

QUERY ACTION SYNTAX

```
1  Syntax 1:
2  <service action="query">
3     <query type="get_member_places">
4        <members>
5           <person>
6           ...
7           </person>
8        </members>
9     </query>
10 </service>
11 Syntax 2:
12 <service action="query">
13    <query type="ft_search">
14       <query_string>properly formatted full-text
15       query</ query_string >
16    </query>
17 </service>
```

The <query> action node supports the following attributes:
Attribute Name: type
Supported Values:
"get_member_places"
Specifies whether or not the server is local to the executing XML script.
get_member_places
Given a member name, retrieves all places of the service of which that specified name is a member. Member places are listed by server name and server names are listed by service which is essentially all servers listed in the place catalog.
ft_search
Given a query string, retrieves all places in the Place Catalog that satisfy the conditions specified in the query For each of the above query types, the results of the query are returned in the format of Table 4.

TABLE 4

QUERY RESULTS SYNTAX

```
1  <servers>
2     <server>
3        <place>
4        </place>
5     </server>
6  </servers>
```

The getPlaces action retrieves all places listed in the place catalog. Table 5 gives the syntax for the getPlaces action. Places are listed by server name. The results of the query are returned in the format of Table 4.

TABLE 5

GETPLACES ACTION SYNTAX

```
<service action="getPlaces">
</service>
```

The getServers action retrieves all QuickPlace servers listed in the place catalog. Places are listed by server name. The syntax for this action is:
Syntax: <service action="getServers">
The results of the getServers query are returned in the format of Table 6.

TABLE 6

GETSERVERS QUERY RESULTS SYNTAX

```
1  <servers>
2     <server>
3     </server>
4  </servers>
```

The search action performs a "full-text" search across all QuickPlaces in the QuickPlace service. It returns an error action status if the QuickPlace configuration specifies that Search Places is disabled or if Search Places for Anonymous Users is disabled and the identity performing the search is anonymous. Table 7 sets forth the syntax and required XML for the search action.

TABLE 7

SEARCH ACTION SYNTAX AND REQUIRED XML

```
1  Syntax:
2     <service action="search" order="1 | 2 | 3" start="n"
3     count="n">
4        <query>
5           "Properly formatted full-text query string"
6        </query>
7  Required:
8     <service action="search">
9        <query order="1 | 2 | 3">
10          "Properly formatted full-text query string"
11       </query>
12    </service>
```

The criteria for the search are specified by the following attributes:
Attribute Name: type
Supported Values:
order A numeric value that specifies the search return sort order. The following values are supported:
1 Return results sorted by relevance
2 Return results sorted with oldest occurrences first
3 Return results sorted with newest occurrences first
start Specifies the starting position of the search results to be returned. A value of zero is used if this attribute is not specified. A starting position of zero specifies that results starting with the first match should be returned.
count Specifies the maximum number of search match hits to be returned. A value of 15 is used if this attribute is not specified. A count of −1 specifies that the maximum number of hits should be returned.

Server Object 101

Server node 101 represents an installed QuickPlace server in the QuickPlace service 100. All actions performed on a QuickPlace server are executed from within the server node hierarchy. In the QuickPlace 3.0 release embodiment actions are performed only on the local server where the XML script 76 is executing. To perform actions on other servers in the service, the XML script is executed on each of the other servers. The server node supports the following actions:
getPlaceTypes
getPlaces
refreshPlaces
forceRefreshPlaces
upgradeAllPlacesAndPlaceTypes forceUpgradeAllPlacesAndPlaceTypes
upgrade
forceUpgrade

Server Node Attributes

The server node supports the following attribute:
Attribute Name: local
Syntax: <server local="true"> </server>
Supported Values: "true" | "false"
Specifies whether or not the server is local to the executing XML script.

Server Node Named Elements

The server node supports the following named elements:
<name>
<hostname>
<port>
<url_prefix>

The <name> element is used by the server node to specify the name of the server. The full canonical name or the abbreviated name of the Domino Server that this script is executing against may be specified. The name used is the name of the local Domino Server in which this script executes. Syntax of the <name> element is set forth in Table 8. The <name> element is required if<local="true"> attribute is not specified or equals "false".

TABLE 8

SYNTAX OF NAME ELEMENT

| | |
|---|---|
| 1 | <server> |
| 2 | <name>QPServer/ACME</name> |
| 3 | </server> |

The <hostname> element is used by the server node to specify the host name that the script executes against. The name used should be an IP address or DNS resolvable host name. Syntax of the <hostname> element is set forth in Table 9. The <hostname> element is required if the <local="true"> attribute is not specified or equals "false".

TABLE 9

SYNTAX OF HOSTNAME ELEMENT

| | |
|---|---|
| 1 | <server> |
| 2 | <hostname>qpserver.acme.com</hostname> |
| 3 | </server> |

The <port> element, which is optional, is used by the server node to specify the listening port of the server against which the script is executing. The syntax of the <port> element is set forth in Table 10.

TABLE 10

SYNTAX OF THE PORT ELEMENT

| | |
|---|---|
| 1 | <server> |
| 2 | <port>80</port> |
| 3 | </server> |

The optional <url_prefix> element is used by the server node to specify the URL prefix to the hostname of the server executing the script. Its syntax is set forth in Table 11.

TABLE 11

URL_PREFIX ELEMENT SYNTAX

| | |
|---|---|
| 1 | <server> |
| 2 | <url_prefix>http://</url_prefix> |
| 3 | </server> |

Server Node Actions

The <server> node supports the following named actions:
getPlacesTypes
getPlaces
forceRefreshPlaces
refreshPlaces
forceUpgradeAllPlacesAndPlaceTypes
upgradeAllPlacesAndPlaceTypes
forceUpgrade
upgrade getPlaceTypes retrieves all placetypes that exist on the specified server. The "standard" QP PlaceType is h_Std-PlaceType. Placetypes are listed by server name. The syntax for getPlaceTypes is:
<server action="getPlaceTypes">
</server>

The results of the action are returned in the format of Table 12.

TABLE 12

GETPLACETYPES RESULTS FORMAT

| | |
|---|---|
| 1 | <server> |
| 2 | <placetypes> |
| 3 | <placetype> |
| 4 | <placetype id="8912471890219238"> |
| 5 | <name>ACMETeamPlacetype</name> |
| 6 | <description>The ACME Team's |
| 7 | Placetype</description> |
| 8 | <additional_information_url> |
| 9 | http://www.acme.com/acmeteaminfo |
| 10 | </additional_information_url> |
| 11 | </placetype> |
| 12 | . . . |
| 13 | </placetypes> |
| 14 | </server> | getPlaces retrieves all places that exist on the specified server. Places are listed by server name.

forceRefreshPlaces refreshes all places on the specified server from their respective placetypes. The refresh action occurs immediately. No action is performed if a place does not adhere to a placetype.

refreshPlaces refreshes all places on the specified server from their respective placetypes. The refresh action occurs at the next scheduled interval when the QuickPlace nightly maintenance process is run on the server. No action is performed if a place does not adhere to a placetype.

forceUpgradeAllPlacesAndPlaceTypes upgrades all places and placetypes on the specified server from a previous QuickPlace release. This action occurs immediately. The upgrade process involves refreshing the design of Quick-Place system files as well as the schema and design of user QuickPlaces. This action will forcibly invoke the upgrade process even if the places and placetypes on the server have already been upgraded.

upgradeAllPlacesAndPlaceTypes upgrades all places and placetypes on the specified server from a previous Quick-Place release. This action occurs immediately. If the server has already been upgraded then this action will have no effect. The upgrade process involves refreshing the design of QuickPlace system files as well as the schema and design of user QuickPlaces. This action will no effect if the places and placetypes on the server have already been upgraded.

forceUpgrade upgrades the specified QuickPlace server from a previous release. This action occurs immediately. All core QuickPlace files are upgraded as well as the admin place if installed on the server. This action will forcibly invoke the upgrade process even if the server has already been upgraded.

upgrade upgrades the specified QuickPlace server from a previous release. This action occurs immediately. All core QuickPlace files are upgraded as well as the admin place if installed on the server. If the server has already been upgraded then this action will have no effect.

Place Object 103

Place node 103 represents a QuickPlace on the QuickPlace server 101 in the QuickPlace service 100. All actions performed on a place are executed from within the server node hierarchy.

The place node supports the following named elements:
<name>
<placetype>

The <name> element is required for all supported place actions (create, remove, etc.) It is used by the place node to specify the name of the place being serviced. This name refers to a place on the local server executing the script.

The <placetype> element is used by the place node to specify the placetype that is associated with the place being serviced. The placetype element is primarily used when creating and refreshing places. When performing operations involving a placetype, the user must previously define the place and assign it an idref id with the <link> element. The placetype is then referenced by the idref value later on in the script.

Place node 103 supports the following actions:
create
remove
forceRemove
update
lock
unlock
repair
refresh
forceRefresh
archive
registerInPlaceCatalog
unregisterInPlaceCatalog
register
unregister
changeHierarchy
sendDailyNewsLetter
sendWeeklyNewsLetter
sendMailToMembers
sendMailToManagersOnly
upgrade
forceUpgrade

PlaceType Object 102

PlaceType node 102 represents a QuickPlace placetype on the QuickPlace server 101 in the QuickPlace service 100. All actions performed on a placetype are executed from within the server node hierarchy.

The placetype node supports the following named element:
<name> which is required for all supported placetype actions. The <name> element is used by the <placetype> node to specify the name of the placetype being serviced. This name refers to a placetype on the local server executing the script.

Placetype supports the following actions:
refresh
forceRefresh
refreshChildPlaces
forceRefreshChildPlaces
upgrade
forceUpgrade
remove
forceRemove The refresh action refreshes the placetype specified by <name> on the server specified by <server>. If the placetype has already been refreshed then the operation will not occur.

TABLE 13

REFRESH ACTION EXAMPLE

```
1  <service><servers>
2      <server local="true">
3          <placetype action="refresh">
4              <name>AcmeTeamPlaceType</name>
5          </placetype>
6      </server>
7  </servers></service>
```

The forceRefresh action refreshes the placetype specified by <name> on the server specified by <server>. If the placetype has already been refreshed then this action will force a refresh of the placetype. Table 14 provides an example.

TABLE 14

FORCEREFRESH ACTION EXAMPLE

```
1  <service><servers>
2      <server local="true">
3          <placetype action="forceRefresh">
4              <name>AcmeTeamPlaceType</name>
5          </placetype>
6      </server>
7  </servers></service>
```

The refreshChildPlaces action refreshes the all derived children of the placetype specified by <name> on the server specified by <server>. If the child placetypes have already been refreshed then the operation will not occur. Table 15 is an example.

TABLE 15

REFRESHCHILDPLACES ACTION EXAMPLE

```
1  <service><servers>
2      <server local="true">
3          <placetype action="refreshChildPlaces">
4              <name>AcmeTeamPlaceType</name>
5          </placetype>
6      </server>
7  </servers></service>
```

The forceRefreshChildPlaces action refreshes the all derived children of the placetype specified by <name> on the server specified by <server>. If the child placetypes have already been refreshed then refresh will occur regardless. Table 16 is an example.

TABLE 16

FORCEREFRESHCHILDPLACES ACTION EXAMPLE

```
1  <service><servers>
2      <server local="true">
3          <placetype action= "forceRefreshChildPlaces">
4              <name>AcmeTeamPlaceType</name>
5          </placetype>
6      </server>
7  </servers></service>
```

The remove action removes the specified placetype from the specified server. Removal of the placetype is performed when the QuickPlace Nightly maintenance process runs on the server. Table 17 is an example.

TABLE 17

REMOVE ACTION EXAMPLE

```
1  <service><servers>
2      <server local="true">
3          <placetype action="remove">
4              <name>AcmeTeamPlaceType</name>
5          </placetype>
6      </server>
7  </servers></service>
```

The forceRemove action removes the specified placetype from the specified server. Removal of the placetype is performed immediately.

The upgrade action upgrades the specified placetype on the specified server from a previous version of QuickPlace. This action occurs immediately. The specified placetype is locked during the upgrade process. If the specified placetype has already been upgraded then this action will have no effect.

The forceUpgrade action upgrades the specified placetype on the specified server from a previous version of QuickPlace. This action occurs immediately. The specified placetype is locked during the upgrade process. If the specified placetype has already been upgraded then this action will force another upgrade of the placetype regardless.

Person Object 115

Person node 115 represents a person on the QuickPlace server 101 in the QuickPlace service 100.

The <person> node 115 supports the following attributes:
local
subscribed_to_newsletter
subscribed_to_calendar_events
using_accessible_ui
email_client The local attribute specifies whether or not the person is local to the specified place XML script. A value of "true" indicates that the person exists only in the specified place. A value of "false" indicates that the person exists externally to the specified place.

The subscribed_to_newsletter attribute specifies whether or not the person subscribed to the place's newsletter.

The subscribed_to_calender_events attribute specifies whether or not the person subscribed to the calendar events in the specified place.

The using_accessible_ui attribute specifies whether or not the person is using an accessibility user interface in the specified place.

The email_client attribute specifies which email client the person uses.

Person Node Named Elements

The person node supports the following named elements:
<dn>
<username>
<first_name>
<last_name>
<password>
<phone_number>
<offline_password>
<description>
<email>
<theme>

The distinguished name <dn> element is required for all supported place actions (create, remove, etc.) if operating on an external user. It is used by the person node to specify the external name of the person being serviced. This name refers to a person in a directory external to QuickPlace. This element is not specified when operating on a person that is local to the specified place The <username> element is used by the person node to specify the person that is associated with the operation being performed. The value specified by this element represents a local user of the specified place. A local user is one that exists purely in the place and not in an external entity such as a directory. To specify an external user then the <dn> element described above is used.

The <password> element requires that the person attribute local="true" be specified. The <password> element is used by the person node to specify the password of the person that is associated with the operation being performed. The value specified by this element represents the password of a local user of the specified place. This password is required when the specified user authenticates with the place. This element is not applicable when the <dn> element is specified.

The <offline_password> element is used by the person node to specify the offline password of the person that is associated with the operation being performed. This password is used when the person authenticates with the place in offline mode. The value specified by this element can be used with either a local person or an external person.

The <theme> element is used by the person node to specify the name of the theme, or skin, associated with the operation being performed. The value specified by this element can be used with either a local person or an external person.

Person Node Actions

Person node 115 supports the following actions:
add
remove
update
rename

The add action adds a person to the specified place. The person may exist locally to the place or may exist externally to the place in an external directory depending upon which attribute is specified for the person (see above). When adding an external person to a place, the external directory is not consulted for existence or name correctness. Any supported attributes or elements of the person can be specified when the add action is performed since the specified person is updated immediately following this add operation.

The add action is performed to initially add a person to the specified place but it does not give that person any rights to access elements of the place. That action is performed by the <member> node. Table 18 illustrates an example of the add action.

TABLE 18

EXAMPLE PERSON NODE ADD ACTION

```
 1  <service>
 2      <servers>
 3          <server>
 4              <name>QPServer/ACME</name>
 5              <hostname>qp.acme.com</hostname>
 6              <port>80</port>
 7              <places>
 8                  <place>
 9                      <name>ACME_Team</name>
10                      <members>
11                          <person local="true"
12                          action="add">
13                              <username >Jane
14                              Doe</username>
15                              <password>BigSecret
16                              </password>
17                              <first_name>Jane
18                              </first_name>
19                              <last_name>Doe
                                </last_name>
20                          </person>
21                          <person action="add">
22                              <dn>cn=Charles Brown,
23                              ou= Sales, o=ACME </dn>
24                          </person>
25                      </members>
26                  </place>
27              </places>
28          </server>
29      </servers>
30  </service>
```

The remove action removes a person from the specified place. The person may exist locally to the place or may exist externally to the place in an external directory depending upon which attribute is specified for the person (see above). Removing a local person removes that person from the specified place. Removing an external person removes that person from the place but not the external directory.

When a person is removed from a place, his access to all rooms in the place is also removed.

The update action updates a person in the specified place. When this action is called, the specified person is updated using the attributes and values specified. Any supported attributes or elements of the person may be specified when the update action is performed. No updates are performed in the external directory.

The rename action renames a person in the specified place. When this action is called, the specified person name is updated to the value specified. All other attributes of the person remain the same after the rename process. The person information in the external directory is not updated by this action. That must be done in a separate process outside of this script.

Group Object 117

Group (external) node 117 represents a group on the QuickPlace server 101 in the QuickPlace service 100. All actions performed on a group are executed from within the place node hierarchy. Group operations are performed on groups that have identities in external directories. (Local groups 118 are groups that exist purely in the place.) Group 117 supports the following actions:
    add
    remove
    update
    rename Member Object 104

Member node 104 (inside room managers, readers and authors) represents a member of one or more rooms 113 in a specified place 114 on QuickPlace server 119 in QuickPlace service 100. All actions performed on a member 104 are executed from within the <room> node hierarchy 113. The member node 104 is primarily used to define, modify, or remove membership access to one or more rooms in the place 114. When performing actions on a member, a person 115, 116 or group 117, 118 that represents the member must have been previously defined in the script. Operations on a member node 104 are performed using an idref link to the person or group nodes previously defined in the script. An idref link relationship is illustrated in Table 19. Member 104 supports add, remove, and rename actions.

TABLE 19

IDREF LINK RELATIONSHIP ILLUSTRATION

```
 1  <members>
 2      <person local="true" id="person1">
 3          <username>jdoe</username>
 4      </person>
 5      <person id="person2">
 6          <dn>cn=Charles Brown,ou=Sales,o=ACME</dn>
 7      </person>
 8  </members>
 9  <rooms>
10      <room>
11          <name>Main.nsf</name>
12          <access>
13              <managers>
14                  <member action="add">
15                      <link idref="person1"/>
16                  </member>
17              </managers>
18              <authors>
19                  <member action="remove">
20                      <link idref="person2"/>
21                  </member>
22              </authors>
23          </access>
24      </room>
25  </rooms>
```

The <person> node is defined first with a corresponding link ID value. That ID value is referenced through the <link idref> element to determine which <person> the <member> node should operate on.

The major distinction between a <person> or <group> and a <member> is that a <person> or <group> represents an entity that the place has information about. A <member> represents a <person> or <group> node's access or membership to a particular room.

Figure 3:
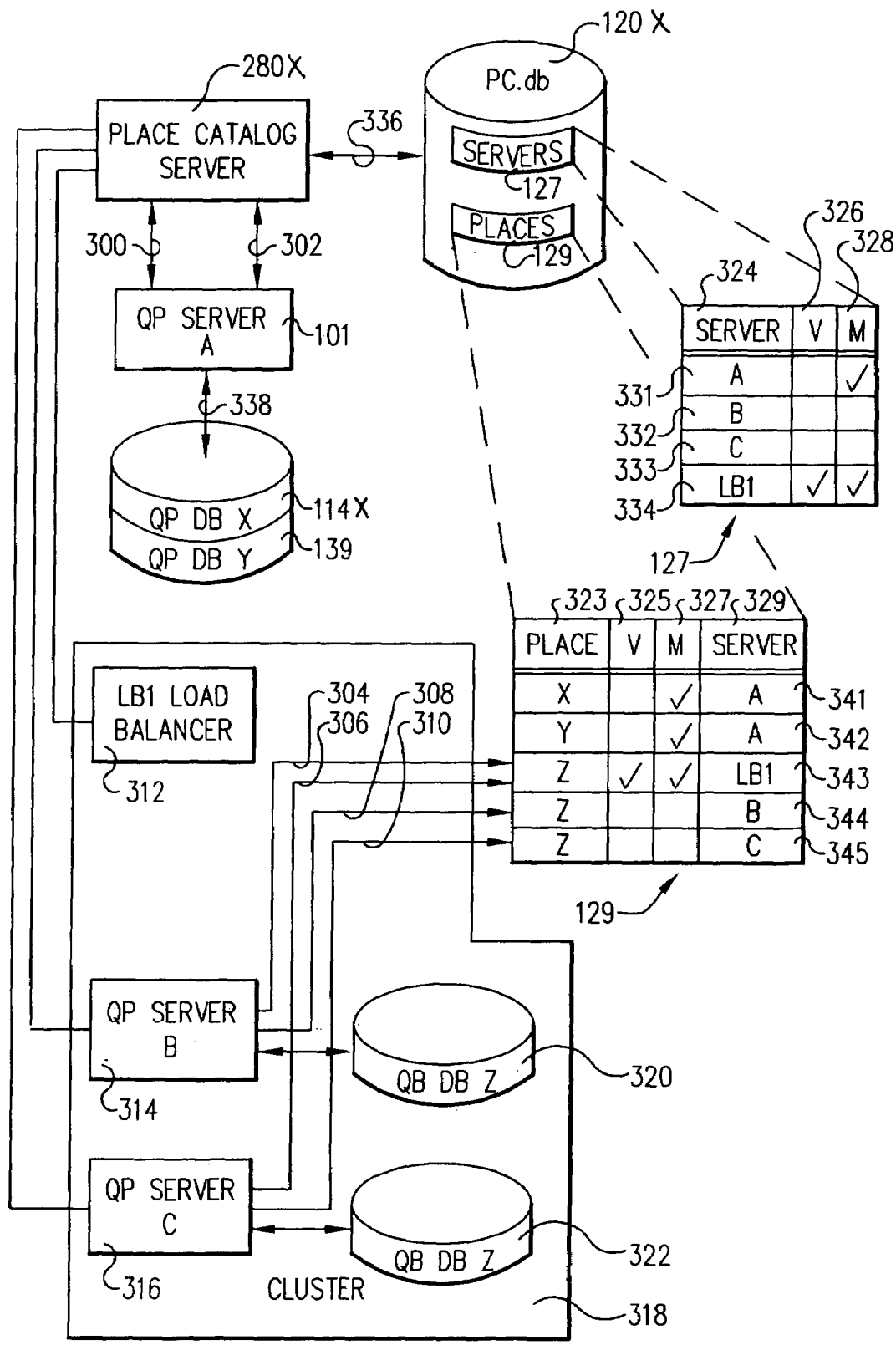
FIG. 3 is a system diagram illustrating dynamic and offline methods for aggregating information about servers and places in a multi-server environment which may include clusters.

Referring to FIG. 3, host, or place, catalog server 280X is a Domino server with QuickPlace installed which has been configured as is represented by line 336 to host catalog database 120 (designated in FIG. 3 as PC.db 120X) which is accessible as is represented by lines 300, 302 to QuickPlace servers 101 in the enterprise through the IBM® Lotus® Notes® RPC (tcp port 1352) and http protocols. A typical project, or QuickPlace, cluster 318 includes a load balancer (LB) LB1 server 312, a plurality of other servers 314, 136, and respective project databases 320, 322. A project cluster 318 is treated as a single virtual server in the service model.

Some entries 331–334, 341–345 are created or updated in the Host catalog 120X in real time—substantially the moment an event happens. Other entries are created or updated manually by a server task, or on a scheduled basis.

As is represented byline 300, it is essential that certain data be sent in real time to avoid conflicts. For example, in a QuickPlace service 100 there cannot be two places 114 (designated in FIG. 3 as OP DB X 114X), 139 with the same name. The creation of a new place 139 is an event that creates a new entry in catalog PC.db 120X in real time. When a user creates a new place, QuickPlace server 101 first checks catalog PC.db 120X database 129 for that name 323 before creating a new entry. If it finds an existing place with that name, the user is prompted to choose a different name. If the creation of a place 139 did not immediately create an entry, it would be possible for two users to successfully create two places with the same name, which would cause a conflict when QuickPlace attempted to create entries for both in the catalog PC.db 120X. To increase availability of host catalog PC.db 120X, the Domino clustering feature can be used to make several host catalog servers 280 available.

Data can be updated in catalog 120 using a QPTool placecatalog-push command or on a schedule on the QuickPlace server 101.

Host catalog PC.db 120X contains information in severs view 127 about servers and in places view 129 abouy places. thus, in host catalog PC.db 120X, there is an entry 331 for server of name 324 A 101, together with entries 326 and identifying whether or note server A 101 is a virtual or master server, respectively. For simple case aggregation, or data update, projects 114, 139 are preconfigured as is repesented by lines 300, 338 to point to host catalog server 280X immediately when changes occur, or as is represented by line 302 at a particular time (say, each day at 2:00 a.m.) Immediate changes may thus be made when change actions occur such as place create, place remove, place lock, change access (add/remove readers, authors, managers), and change title. Scheduled updates may be made, for example, for changes such as least modified, tirle, size, last accss.

Complex aggregation is required when working with clusters 318.

Each entry in catalog PC.db 120X has a virtual indicia entry 325, 326 and master indicia entry 328, 327. A master entry, such as entry 343, is the entry through which all access to the catalog occur for a given cluster of servers 312, 314, 316. In FIG. 3, servers A 101 and LB1 312 are master servers, and columns 327 and 328 are set for corresponding entries 331, 334, and 341–343. Each place 323 is identified as to its server 329.

A virtual server is a server that does not have project (such as, place) data, but knows how to connect place users to the project servers 314, 316 which do have place data 320, 322. Server LB1 312 is a virtual server because it does not have place data in a database. Project servers A 101, B 314, and C 316 are not virtual servers because they do have place data in databases X 114, Y 139, and Z 320, 322. Databases Z 320, 322 are clustered, so they are identical; a change to one is immediately replicated to the other.

Complex aggregation for clusters is done by sending immediate updates as are represented by lines 304 and 306 to master entries 334, 343. All other updates are sent, as are represented by lines 308 and 310, to the corresponding place entry 344, 345 for the respective servers B 314, C 316. For scheduled update, host catalog server 280 executes a process to merge entries from the virtual master LB1 312 (see entry 343, which has virtual field 235 and master field 327 set) to merge entries from the virtual master entry 343 to entries 344, 345 for other servers B 314, C 316.

The Host catalog feature is enabled by the administrator creating a host catalog database 120X and a configuration file.

Host catalog 120X may be created by using a PlaceCatalog.ntf template to create a Notes database. The template is put in the Domino data directory where QuickPlace is installed. Access control on catalog 120X is granted only to all the project servers 101, etc. and to administrators of the system.

The PlaceCatalog feature is configured for each server 101, etc., that interacts with PlaceCatalog server 280X through a configuration file formatted as xml. That is, each QuickPlace server 101, etc., that wishes to operate with a PlaceCatalog 120X must have its own configuration file. The name of the file is qpconfig.xml, and is set forth in Table 20.

TABLE 20

PLACE SERVER CONFIGURATION FILE FOR CLUSTERING
(qpconfig.xml)

```
 1  <?xml version="1.0" standalone="yes"?>
 2  <server_settings>
 3    <place_catalog_settings enabled="true">
 4      <log_level>4</log_level>
 5      <domino_server_name>cat1/acme</domino_server_name>
 6      <nsf_filename>PlaceCatalog.nsf</nsf_filename>
 7    </place_catalog_settings>
 8    <cluster_settings>
 9      <master virtual="true">
10        <hostname>qp.acme.com</hostname>
11      </master>
12    </cluster_settings>
13  </server_settings>
```

Cluster_settings (Table 20, lines 8–12) contains settings related to the clustering feature as it relates to the server associated with this configuration file. The PlaceCatalog understands the clustering configuration so it can make the proper decisions when registering places with the Host catalog. This cluster_settings section includes the following:

1. Master

In QuickPlace clustering there is a concept of a "master" server 312. It specifies which server in the cluster 318 acts as the "entry point" to a QuickPlace 320, 322. It can be a QuickPlace server or it can be a network dispatcher which acts as a "virtual" server. The following argument is available in this section:

virtual="yes"

virtual="no" (default)

which specifies if the master server is a device other than a QuickPlace server such as a network dispatcher or local director 312. Master includes:

2. Hostname which specifies the hostname in tcpip format of the master server 312 in a QuickPlace cluster 318 (i.e. qp.acme.com). This is the host name of a network dispatcher or local director (virtual must be "yes" above) or the hostname of a QuickPlace server (virtual must be "no" above)

Each time a place is created, it is registered in real-time with host catalog server 280X. This means that PlaceCatalog is configured on a QuickPlace server 101, and the host catalog server 280X must be operational for users to be able to create places.

When a QuickPlace manager adds, removes or changes a member's access level, an update is done to host catalog 120X.

Host catalog 120X may be queried to retrieve a list of places 114 in which a user, or one of the groups 117, 118 of which the user is a member 104, 116, is a member 104.

When a user performs a search scoped to a number of QuickPlaces 114, 139, 320, 322 on one or more servers 101, 312, the system uses a search domain server to perform the search and it also uses the host catalog server 280 to properly construct the URLs to the places found in the search request. For this reason, the search domain server (not separately shown, but similar to server 101) is configured to recognize host catalog server 280.

Last accessed updates may be made in real time (say, every 1 minute) to host catalog 120X.

Certain information maintained in host catalog 120X may not updated in real-time. Examples include place size and the last time it was accessed or modified. This information must be updated in batch mode. This is accomplished by running a qptool utility function "UpdatePlaceCatalog" on, for example, a daily basis. This can be automated as a Domino program entry similar to the QuickPlaceNightly tool.

When using QuickPlace clusters 318, host catalog 120X data is maintained for each node 312, 314, 316 in the cluster as well as for a virtual place representing the combination of all nodes if and only if a network dispatcher or local director has been configured and the proper settings reflect it in the qpconfig.xml configuration file. In this case, real-time updates to the catalog are done to the virtual place entry 343 and the non-real time updates are done to each of the cluster node entries 344, 345. This allows the administrator flexibility in knowing differences in access and size for each of the nodes in the cluster.

The last accessed time updates may present a problem in large installations. For this reason, a replica of the Host catalog 120X may be created for each QuickPlace server 101.

There are two QuickPlace server cluster environment alternatives for storing QuickPlace server cluster data in Host catalog 120X.

1. If cluster 318 does not have a virtual server 312, data is maintained in separate entries in host catalog 120X for each physical server 314, 316, and for each place 320, 322 on a physical server.
2. If cluster 318 has a virtual server 312, each physical server 314, 316 and place 320, 322 has an entry 344, 345, respectively. But there is also an entry 343 for the virtual server 312 that represents the combination of all physical servers. And there is an entry for each place in the cluster that represents all the replicas of the place in the cluster. When the cluster has a virtual server 312, real-time updates to host catalog 120X (such as place creation, locking of a place, and place membership changes) are made in place entries 334, 343 corresponding to the virtual server. The non-real time updates (such as place size, time last accessed, and time last modified) are made to the place entries 344, 345 corresponding to the physical servers 314, 316 in the cluster. This information allows the administrator to know the differences in access 399 and size 349 for the places 320, 322 in each of the physical servers 314, 316 in the cluster 318.

A QPTool placecatalog command with the -update flag set synchronizes the place entries 344, 345 that correspond to the physical servers 314, 316, and the place entries 343 that correspond to the virtual server 312.

To set up a virtual server 312 for a QuickPlace cluster 318, a network dispatcher is configured, such as IBM Network Dispatcher Version 3.6, with proper settings configured on each server 312, 314, 316 in the cluster 318.

Figure 4:
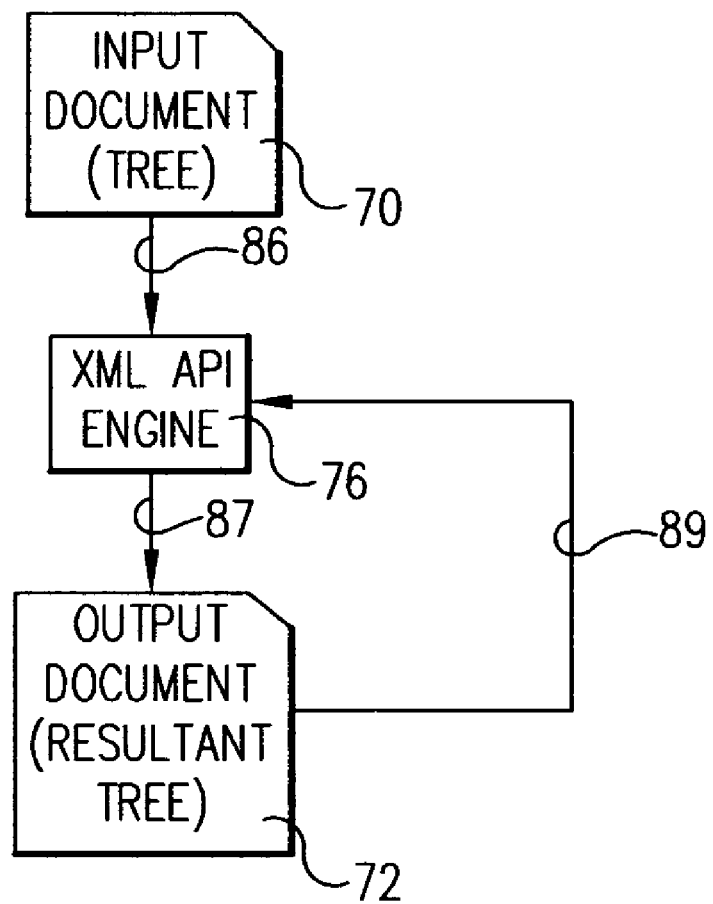
FIG. 4 is a flow chart representing generation of an output document, or resultant tree.

Referring to FIG. 4, XML 70 input 86 to and XML 72 output 87 from the APIs perform multiple actions in one call. Table 21 illustrates an example input tree, or document, 70, and Table 22 an example output document, or resultant tree, 72. Input data 86 for all APIs are the same. That is, the same object representation is used across all APIs. As is represented by reentrant line 89, input and output of an API call can be the input to another, and error and status indications are returned and maintained for each action. Reentrant path 89 provides for processing output document 72 through engine 76 if an error is found in input 86 or if new script is generated in output 87. In the later case, engine 76 is used to generate new programs 72 out of input programs 70. The methods are extensible to add support for new actions, support for multiple servers, including multiple servers within a service, and support for the ability to impersonate a person. Resultant tree 72 can be reinvoked, as is represented by reentrant path 89, selectively to generate new trees with or without action and, if there were errors, to rerun. During the rerun, engine 76 will start where it left off and process only those nodes that failed, and children of those nodes.

XML is created to represent, for example, a QuickPlace object. Each API capable object has an action attribute associated with it. This action attribute represents the API to be invoked. The XML 70 is passed into a Java method 76, which then processes the XML and returns an updated form 72 of the input XML 70. Upon completion, XML 72 similar to the input XML 70 is returned.

TABLE 21

EXAMPLE INPUT DOCUMENT (TREE 70)

```
1  <service><servers>
2      <server local = "true"
3          <places>
4              <place action = "lock">
5                  <name>haikuteam</name>
6              </place>
7          </places>
8      </server>
9  </servers></service>
```

The XML of Table 21 is used to lock the place haikuteam on the local server. After the lock API is invoked the XML of Table 22 is returned.

TABLE 22

EXAMPLE OUTPUT DOCUMENT (RESULTANT TREE 72)

```
1  <service><servers>
2      <server local = "true">
3          <places>
4              <place>
5                  <name>haikuteam</name>
6                  <action_result action = "create">
7                      <status>0</status>
8                  </action_result>
9              </place>
10         </places>
11     </server>
12 </servers></service>
```

When an action is executed on a QuickPlace object, a child node is created with the action status. This status represents if the action was successful through the returned status code in the action_result node.

To run the XML API as a person, a separate piece of XML is passed into the API. This XML identifies a given person's identity. The default person is the local server. An example of a session is provided in Table 23.

TABLE 23

EXAMPLE SESSION RUNNING XML API AS A PERSON

```
1  <session>
2      <person>
3          <dn>CN=Sami Shalabi, OU=Westford, O=IBM</dn>
4      </person>
5  </session>
```

If API 76 uses this session XML, the actions are invoked using the identifier
"CN=Sami Shalabi,OU=Westford,O=IBM".

Figure 5:
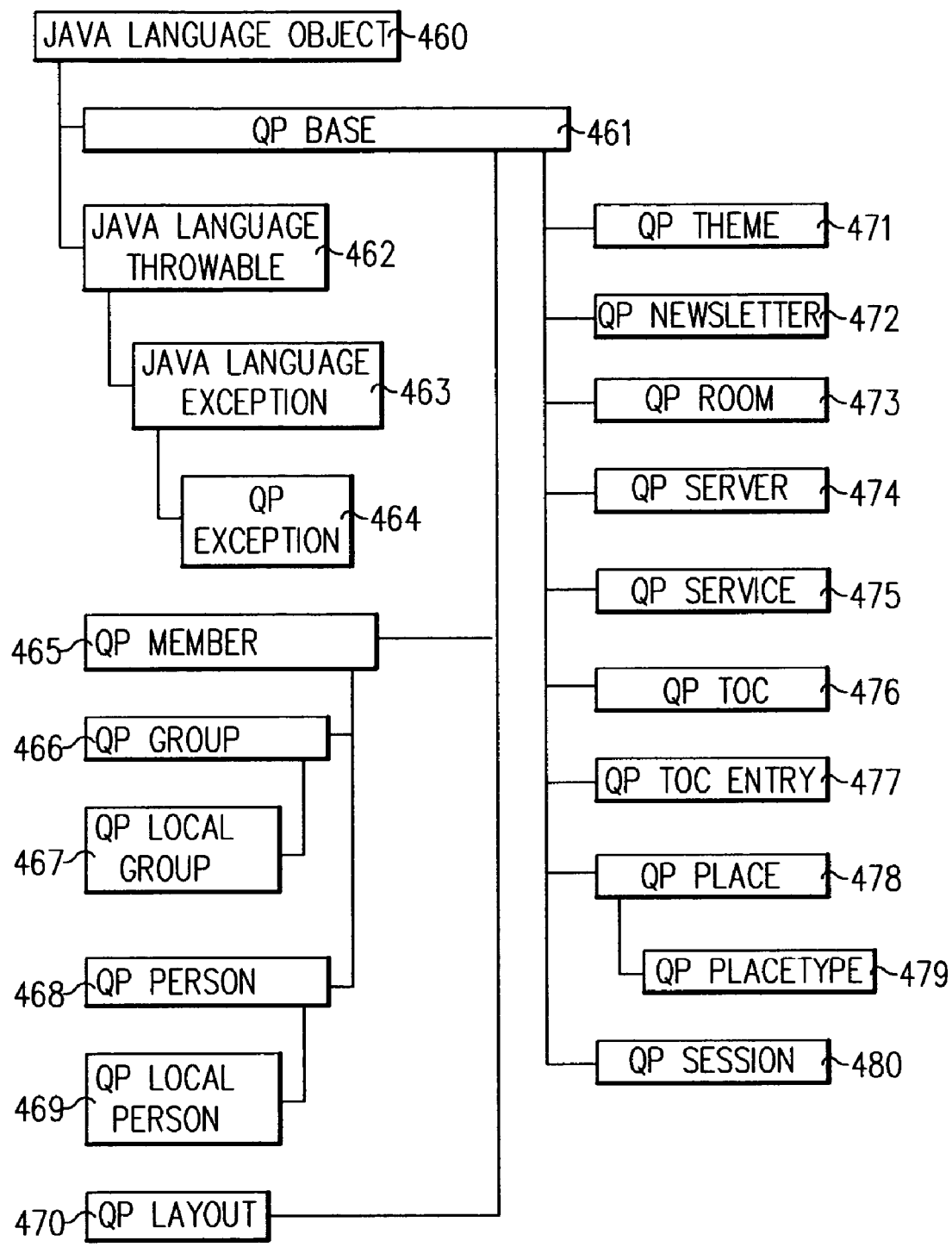
FIG. 5 is a diagrammatic illustration of the object model of the preferred embodiment of the invention presented as an inheritance model.
Figure 6:
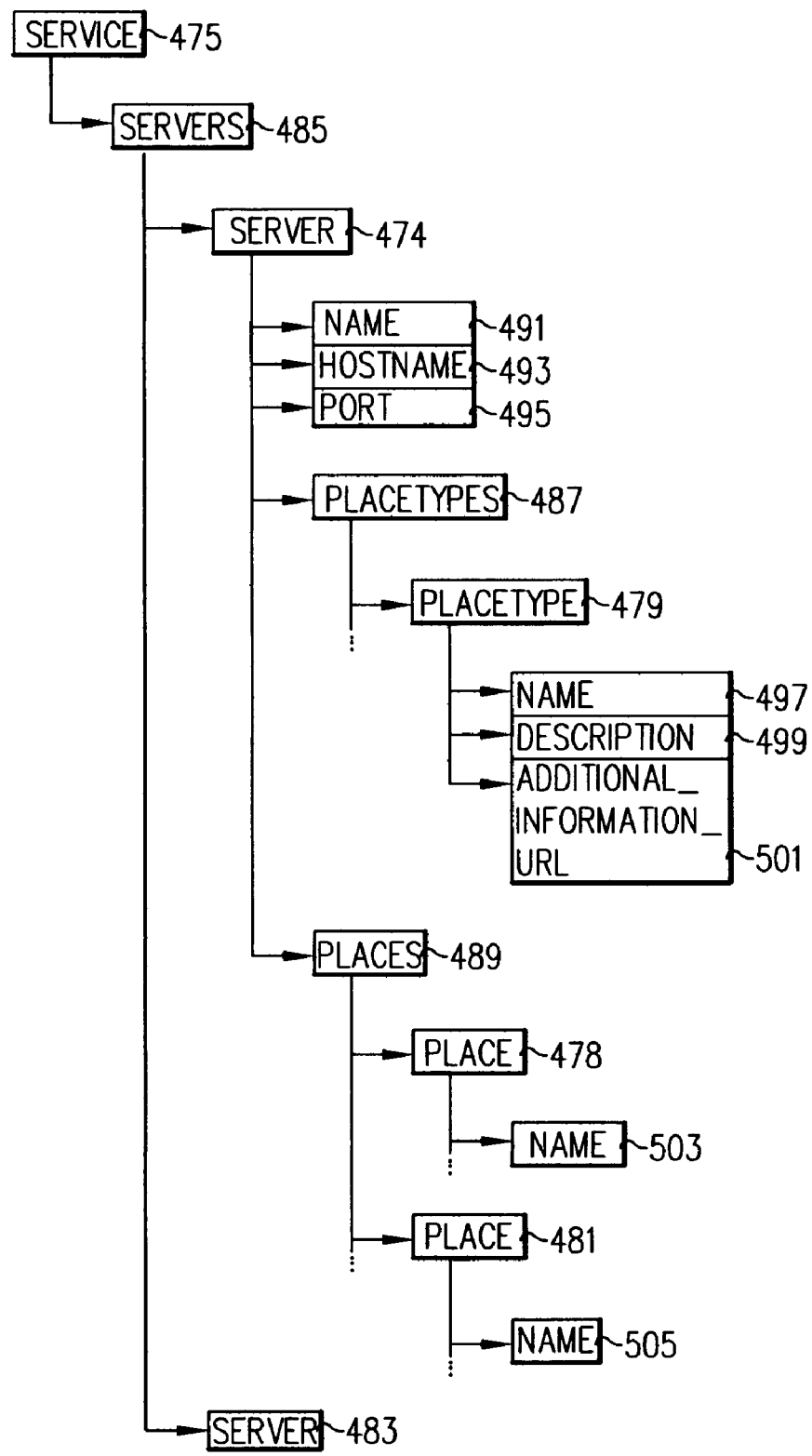
FIG. 6 is a second diagrammatic illustration of the object model of the preferred embodiment of the invention presented as a containment model.

Representing and manipulating place data is accomplished through the object model represented by the hierarchy of FIGS. 5 and 6.

Referring to FIGS. 5 and 6, Java class objects implementing the system and method of the preferred embodiments of the invention for programmatically representing and manipulating place data across a service are shown, and described in the tables which follow.

In FIG. 6, each object has a set of methods than can be invoked upon it. The containment model of this FIG. 6, therefore, shows the way objects are traversed, that is searched or identified, in order to reach properties (that is, invoke methods to retrieve data). For example, to get to placetype 487, processing must go from service 475 to servers 485 to server 474. Examples of data in FIG. 6 are name 491, hostname 493, port 495, name 497, description 499, additional_information_url 501, name 503, and name 505. To get to server name 491, processing goes from service 475 to servers 485 to find server 474 or 483 with name 491. This shows how objects relate to each other; that is, service 475 contains server 485, which contains one or more servers 474, 483, and so on. Objects contain properties of two types: straight properties and objects. Straight properties, or data, of server 474 are illustrated by name 491, hostname 493 and port 495. Properties which are objects are illustrated by placetypes 487; these objects are leafs in the tree which continue to grow (in this case, extending to placetype 479 and so on). The objects servers 485, placetypes 487, and places 489 provide a level of indirection that encapsulates groups of the same type. For example, servers 485 encapsulates a group of individual servers 474, 483, making it easier to treat them as a unit.

In FIG. 6, every node that is an object has a set of methods that can be invoked on that object. FIG. 6, therefore, represents a containment model which illustrates how objects are traversed, searched, or identified, in order to invoke methods on them. This also is a data representation, in that it shows how objects are traversed, searched or identified, in order to get to its data. This model, therefore, supports in a distributed environment, or service, the generating of reports with respect to a service, and the exporting of data from one distributed environment into another; and the traversing of a tree of objects within a service, or distributed environment, to access a predetermined node for executing supported methods on an object.

In FIG. 5, the object model of FIG. 6 is represented as XML—a list of objects and how they inherit. If the properties 491, 493, 495, 497, 499 501, 503, and 505 were removed from FIG. 6 the result would show the relationships of objects inside of the programming model of FIG. 2. This FIG. 5 shows how child objects inherit from, or extend, their parents.

The methods and instance variables for selected class objects in the hierarchy of Table 1 and FIGS. 5 and 6 are as follows.

QPBase 461

Public abstract class QPBase 461 extends Java language object 460. Table 24 gives its methods and instance variables.

TABLE 24

QPBASE

```
1  Methods:
2  protected void finalize( ),
3      overide: finalize in class object
4  public void fromXML(Node xml),
5  public string getID( ),
6  protected void setID(String id), and
7  public Node toXML(Document doc) throws QPException.
8  Constructor Methods:
9  public QPBase( )
10 Variables:
11 public static final int QUICKPLACE_UNKNOWN
12 public static final int QUICKPLACE_DOCUMENT
13 public static final int QUICKPLACE_FOLDER
14 public static final int QUICKPLACE_ROOM
15 public static final int QUICKPLACE_FORM
16 public static final int QUICKPLACE_FIELD
17 public static final int QUICKPLACE_THEME
```

QPLayout 470

Public class QPLayout 470 extends QPBase 461. Its methods and variables are set forth in Table 25.

TABLE 25

QPLAYOUT

```
1  Methods:
2  public static int getThemeTypeFromName(String name)
3      throws QPException
4  protected void init( ) throws QPException
5      Initialize the object. Loads the data from disk.
6  public QPTheme getTheme( ) throws QPException
7      Gets the value of _theme.
8      Returns the value of _theme.
9  public void setTheme(QPTheme arg_theme)
10     Sets the value of _theme
11     Parameters: arg_theme - Value to assign to this._theme
12 public String getName( )
13     Gets the value of _name
14     Returns the value of _name
15 public void setName(String arg_name)
16     Sets the value of _name
17     Parameters: arg_name - Value to assign to this._name
18 public int getType( )
19     Gets the value of _type
20     Returns: the value of _type
21 public void setType(int arg_type)
22     Sets the value of _type
23     Parameters: arg_type - Value to assign to this. _type
24 public String getContents( )
25     Gets and returns the value of _contents
```

TABLE 25-continued

QPLAYOUT 26 public void setContents(String arg__contents)
27     Sets the value of __contents
28     Parameters: arg__contents - Value to assign to
29         this.__contents
30 Constructor Methods:
31 public QPLayout(QPTheme theme, String name)
32     throws QPException
33
34 Variables:
35 protected QPTheme __theme
36 protected String __name
37 protected int __type

QPMember 465

Public class QPMember 465 extends QPBase. Its methods and variables are in Table 26.

TABLE 26

QPMEMBER

1 Methods:
2 public void reset( ) throws QPException
3 public void save( ) throws QPException
4 public void remove( ) throws QPException
5 public void setDistinguishedName (String
6     szDistinguishedName)
7 public String getDistinguishedName( )
8 public void setCommonName(String szCommonName)
9 public String getCommonName( )
10 publid boolean isLocal( ) throws QPException
11 public boolean isExternal( ) throws QPException
12 public boolean isGroup( ) throws QPException
13 public boolean isPerson( ) throws QPException
14 public boolean isNew( ) throws QPException
15 protected void setNew(boolean b) throws QPException
16 protected void init( ) throws QPException
17 public boolean isSubscribedToNewsLetter( )
18 public void setSubscribedToNewsLetter(boolean b)
19 public void setEmail(String szEmail)
20 public String getEmail( )
21 public void setDescription(String szDescription)
22 public String getDescription( )
23 protected void open( ) throws QPException
24 protected boolean isOpen( ) throws QPException
25 protected QPPlace getPlace( ) throws QPException
26 protected void rename(String newDn, boolean bIsGroup,
27     boolean bIsLocal) throws QPException
28 protected native void nRename(string newDn,
29     boolean bIsGroup, boolean bIsLocal)
30 Constructor Methods:
31 public QPMember(QPPlace place, String dn)
32     throws QPException
33 public QPMember(QPPlace place, String dn,
34     boolean bIsNew) throws QPException
35 Variables:
36 protected static final int EMAIL__CLIENT__UNKNOWN
37 protected static final int EMAIL__CLIENT__NOTES5
38 protected static final int EMAIL__CLIENT__NOTES6
39 protected static final int EMAIL__CLIENT__OUTLOOK
40 protected static final int EMAIL__CLIENT__ICAL
41 protected static final int EMAIL__CLIENT__OTHER
42 protected QPPlace __place
43 protected String __distinguishedName
44 protected String __commonName
45 protected boolean __isOpen
46 protected boolean __isNew
47 protected String __email
48 protected String __description
49 protected boolean __isSubscribedToNewsLetter

QPGroup 466

Public class QPGroup 466 extends QPMember 465. Its methods are set forth in Table 27.

TABLE 27

QPGROUP

1 Methods:
2 public boolean isGroup( ) throws QPException
3     Override: isGroup in class QPMember
4 Constructor Methods:
5 public QPGroup(QPPlace place, String dn) throws QPException
6 public QPGroup(QPPlace place, String dn, boolean bIsNew)
7 throws QPException
8     QPMember constructor comment.

QPLocalGroup 467

Public class QPLocalGroup 467 extends QPGroup, which extends QPMember, which extends QPBase, which extends java.lang.Object. The methods of QPLocalGroup 467 are in Table 28.

TABLE 28

QPLOCALGROUP

1 Methods:
2 public boolean isLocal( ) throws QPException
3     Overrides: isLocal in class QPMember
4 public String get GroupName( )
5 public void reset( ) throws QPException
6     Overrides: reset in class QPMember
7 Constructor Methods:
8 public QPLocalGroup(QPPlace place, String groupName) throws
9 QPException
10 public QPLocalGroup(QPPlace place, String groupName, boolean
11 bIsNew) throws IQPException
    QPMember constructor comment.

QPPerson 468

Public class QPPerson 468 extends QPMember. Its methods and variables are in Table 29.

TABLE 29

QPPERSON

1 Methods:
2 public boolean isGroup( ) throws QPException
3     Overrides: isGroup in class QPMember
4 public void setOfflinePassword(String szPassword)
5 public boolean isUsingAccessibleUserInterface( )
6 public void setUsingAccessibleUserInterface(boolean
7     bUsingAccessibleUserInterface)
8 public boolean isSubscribedToCalendarEvents( )
9 public void setSubscribedToCalendarEvents(boolean b)
10 public void setEmailClient(String value)
11 public void setEmailClient(int EmailClient)
12 public int getEmailClient( )
13 public void setTheme(String szTheme)
14 public String getTheme( )
15 public void reset( ) throws QPException
16     Overrides: reset in class QPMember
17 Constructor Methods:
18 public QPPerson (QPPlace place, String dn) throws
19 QPException
20 public QPPerson(QPPlace place, String dn, boolean bIsNew)
21     throws QPException TABLE 29-continued

| QPPERSON |
|---|
| 22 Variables: |
| 23 protected String __offlinePassword |
| 24 protected String __themeName |
| 25 protected boolean __isUsingAccessibleUserInterface |
| 26 protected boolean __isSubscribedToCalendarEvents |
| 27 protected int __emailClient |

QPLocal Person 469

Public class QPLocalPerson 469 extends QPPerson, which extends QPMember, which extends QPBase. The methods of QPLocalPerson 469 are in Table 30.

TABLE 30

| QPLOCALPERSON |
|---|
| 1 Methods: |
| 2 public boolean isLocal( ) throws QPException |
| 3     Overrides: isLocal in class QPMember |
| 4 public String getUserName( ) |
| 5 public void setPassword(String szPassword) |
| 6 public String getEncryptedPassword( ) |
| 7 public void setFirstName(String szFirstName) |
| 8 public String getFirstName( ) |
| 9 public Void setLastName(String szLastName) |
| 10 public String getLastName( ) |
| 11 public void setPhoneNumber(String szPhoneNumber) |
| 12 public String getPhoneNumber( ) |
| 13 public void reset( ) throws QPException |
| 14     Overrides: reset in class QPPerson |
| 15 Constructor Methods: |
| 16 public QPLocalPerson (QPPlace place, String userName) throws |
| 17 QPException |
| 18 public QPLocalPerson(QPPlace place, string userName, boolean |
| 19 bIsNew) throws QPException |

QPNewsletter 472

Public class QPNewsletter 472 extends QPBase. Its methods and variables are in Table 31.

TABLE 31

| QPNEWSLETTER |
|---|
| 1 Constructor Methods: |
| 2 public QPNewsletter( ) |
| 3 Variables: |
| 4 public static final int DAILY_FORMAT |
| 5 public static final int WEEKLY_FORMAT |

QPPlace 478, 481

Public class QPPlace 478 extends QPBase 461. Its methods and variables are in Table 32.

TABLE 32

| QPPLACE |
|---|
| 1 Methods: |
| 2 public void set(QPACollectionEntry entry) |
| 3     Method to set object data from a Collection Entry |
| 4     object. |
| 5     Parameters:   placeData -   the Map object |
| 6                                     containing data. |

TABLE 32-continued

| QPPLACE |
|---|
| 7 public QPTheme getTheme(String themeName) |
| 8     throws QPException |
| 9 public QPServer getServer( ) throws QPException |
| 10 public void lock( ) throws QPException |
| 11 public void lock(String message) throws QPException |
| 12 public void unlock( ) throws QPException |
| 13 public boolean isLocked( ) throws QPException |
| 14 public void remove(boolean now) throws QPException |
| 15 public void remove( ) throws QPException |
| 16 public String getName( ) throws QPException |
| 17 public boolean isPlaceType( ) |
| 18 public boolean isSystem( ) |
| 19 public QPPerson addPerson(String szMemberDN) |
| 20     throws QPException |
| 21 public QPGroup addGroup(String szGroupDN) |
| 22     throws QPException |
| 23 public QPLocalPerson addLocalPerson(String szUserName) |
| 24     throws QPException |
| 25 public QPPerson getPerson(String szDN) |
| 26     throws QPException |
| 27 public QPGroup getGroup(String szDN) throws QPException |
| 28 public QPLocalPerson getLocalPerson(String szUerName) |
| 29     throws QPException |
| 30 public String getUrl( ) throws QPException |
| 31     Returns the URL of the top room of the place as the |
| 32     URL for the place itself. |
| 33 public QPRoom getTopRoom( ) throws QPException |
| 34 public QPRoom getRoom(String name) throws QPException |
| 35 public String getTitle( ) throws QPException |
| 36 public void setTitle(String szTitle) throws QPException |
| 37 public void refresh(boolean bForceRefresh) |
| 38     throws QPException |
| 39 public void repair( ) throws QPException |
| 40 public void archive(String path) throws QPException |
| 41 public void sendNewsletters(int format) |
| 42     throws QPException |
| 43 public void upgrade(boolean bForceUpgrade) |
| 44     throws QPException |
| 45 public void updatePlaceCatalog( ) throws QPException |
| 46 public void sendMail(boolean bMangersOnly, |
| 47     String from, String cc, String bcc, |
| 48     String subject, String body) throws QPException |
| 49 protected void init( ) throws QPException |
| 50 protected void addRoom(QPRoom room) throws QPException |
| 51 public Node toXML(Document doc) throws QPException |
| 52     Generate XML describing this object. |
| 53     Parameters: doc -     the Dom tree to build the XML |
| 54                                     in. |
| 55     Returns: A pointer to the DOM tree. |
| 56     Overrides: toXML in class QPBase |
| 57 public void setMetaData(String name, String value) |
| 58     throws QPException |
| 59 public String getMetaData(string name) |
| 60     throws QPException |
| 61 public void changehierarchy(String oldHier, |
| 62     String newHier) throws QPException |
| 63 protected native void nChangeHierarchy(String oldHier, |
| 64     String newHier) |
| 65 Constructor Methods: |
| 66 public QPPlace(QPServer server, String placeName, |
| 67     boolean bIsSystem) throws QPException |
| 68 public QPPLace(QPServer server, String placeName) |
| 69     throws QPException |
| 70 public QPPlace(QPServer server, QPCollectionEntry |
| 71     placeData) throws QPException |
| 72         Constructor for instantiating a Place object from |
| 73         a Collection object. |
| 74     Parameters:    session - The QP Session object. |
| 75                   placeData -     A Collection Entry |
| 76                                      containing place |
| 77                                      data. |
| 78 Variables: |
| 79 protected QPServer __server |
| 80 protected String __name |
| 81 protected String __title |
| 82 protected String __size |
| 83 protected String __last_accessed |

TABLE 32-continued

QPPLACE

| | |
|---|---|
| 84 | protected String __last__modified |
| 85 | protected Hashtable __rooms |
| 86 | protected Boolean __isLocked |
| 87 | protected boolean __isSystem |
| 88 | protected QPMap __metaData |

QPPlaceType 479

Public class QPPlaceType 479 extends QPPlace 478. Its methods and variables are in Table 33.

TABLE 33

QPPLACETYPE

| | |
|---|---|
| 1 | Methods: |
| 2 | public boolean isPlaceType( ) |
| 3 |     Overrides: isPlaceType in class QPPlace |
| 4 | public Node toXML(Document doc) throws QPException |
| 5 |     Overrides: toXML in class QPPlace |
| 6 | public String getDescription( ) throws QPException |
| 7 | public String getAdditionalInformationUrl( ) |
| 8 |     throws QPException |
| 9 | public void refresh(boolean bForceRefresh) |
| 10 |     throws QPException |
| 11 |     Overrides: refresh in class QPPlace |
| 12 | public void remove(boolean bNow) throws QPException |
| 13 |     Overrides: remove in class QPPlace |
| 14 | public void refreshChildPlaces(boolean bForceRefresh) |
| 15 |     throws QPException |
| 16 | public void upgrade(boolean bForceUpgrade) |
| 17 |     throws QPException |
| 18 |     Overrides: upgrade in class QPPlace |
| 19 | Constructor Methods: |
| 20 | public QPPlaceType(QPServer server, String placeName, |
| 21 |     boolean bIsSystem) throws QPException |
| 22 | public QPPlaceType(QPServer server, String placeName) |
| 23 |     throws QPException |
| 24 | Variables: |
| 25 | protected String __description |
| 26 | protected String __additionalInformationUrl |

QPRoom 473

Public class QPRoom 473 extends QPBase 461. Its methods and variables are in Table 34.

TABLE 34

QPROOM

| | |
|---|---|
| 1 | Methods: |
| 2 | public static int getRoomTypeFromName(String name) |
| 3 |     throws QPException |
| 4 | public QPTheme getCurrentTheme( ) throws QPException |
| 5 | public String getName( ) |
| 6 | public QPPlace getPlace( ) |
| 7 | public synchronized QPToc getToc( ) throws QPException |
| 8 | public QPCalendarEvent createCalendarEvent( ) |
| 9 | public String getUrl( ) throws QPException |
| 10 | public void addManager(QPMember member) |
| 11 | public void addAuthor(QPMember member) |
| 12 | public void addReader(QPMember member) |
| 13 | public void removeAccess(QPMember member) |
| 14 | protected void init( ) throws QPException |
| 15 | protected String getCurrentThemeName( ) |
| 16 | Constructor Methods: |
| 17 | public QPRoom(QPPlace place, String name) |
| 18 |     throws QPException |

TABLE 34-continued

QPROOM

| | |
|---|---|
| 19 | Variables: |
| 20 | protected QPPlace __place |
| 21 | protected String __systemName |
| 22 | protected QPRoom __parent |
| 23 | protected QPToc __toc |
| 24 | protected int __type |

QPServer 474, 483

Public class QPServer 474 extends QPBase 461. Its variables and methods are in Table 35.

TABLE 35

QPSERVER

| | |
|---|---|
| 1 | Methods: |
| 2 | public void set(QPCollectionEntry entry) |
| 3 |     Method to set object data from a Collection Entry |
| 4 |     object. |
| 5 |     Parameters:    entry -    The Collection object |
| 6 |                                             containing data. |
| 7 | public Vector getPlaceTypes( ) throws QPException |
| 8 | public Vector getPlaces( ) throws QPException |
| 9 | public QPPlace getPlace(String qpName) |
| 10 |     throws QPException |
| 11 | public QPPlaceType getPlaceType(String ptName) |
| 12 |     throws QPException |
| 13 | public QPTheme getTheme(String themeName) |
| 14 |     throws QPException |
| 15 | public QPPlace getSystemPlace( ) throws QPException |
| 16 | public QPPLace createPlace(String szPlaceName, |
| 17 |     String szManagerDN) throws QPException |
| 18 | public QPPlace createPlace(string szPlaceName, |
| 19 |     String szManagerDN, String szPlaceTypeName) |
| 20 |     throws QPException |
| 21 | public QPPlace createPlaceForLocalPerson(String szPlaceName, |
| 22 |     String szUerName, String szPlaceTypeName) throws |
| 23 |     QPException |
| 24 | public void registerPlace(String szPlaceName, |
| 25 |     boolean bOnlyPlaceCatalog) throws QPException |
| 26 | public void unregisterPlace(String szPlaceName, |
| 27 |     boolean bOnlyPlaceCatalog) throws QPException |
| 28 | public void register( ) throws QPException |
| 29 | public void unregister( ) throws QPException |
| 30 | public QPPlace createPlaceForLocalPerson(String szPlaceName, |
| 31 |     String szUserName) throws QPException |
| 32 | public String getUrl( ) throws QPException |
| 33 | public synchronized void loadConfig( ) |
| 34 |     throws QPException |
| 35 | public void refrshPlaces(boolean bForceRefresh) |
| 36 |     throws QPException |
| 37 | public void repairPlaces( ) throws QPException |
| 38 | public void upgrade(boolean bForceUpgrad) |
| 39 |     throws QPException |
| 40 | public void upgradeAllPlacesAndPlaceTypes(boolean |
| 41 |     bForceUpgrade) throws QPException |
| 42 | public void cleanupRemovedPlacesAndPlaceTypes( ) |
| 43 |     throws QPException |
| 44 | public void cleanupDeadmail( ) |
| 45 | public void updatePlaceCatalog( ) throws QPException |
| 46 |     Update the place catalog for all places. |
| 47 | public String getConfigValue(String xpath) |
| 48 |     throws QPException |
| 49 | protected String getOrg( ) throws QPException |
| 50 | public Vector getHostnames( ) |
| 51 | protected void init( ) throws QPException |
| 52 | public Node toXML(Document doc) throws QPException |
| 53 |     Generate XML describing this object. |
| 54 |     Parameters:    doc -    The DOM tree to build the XML |
| 55 |                                             in. |
| 56 |     Returns: A pointer to the DOM tree. |
| 57 |     Overrides: toXML in class QPBase |

TABLE 35-continued

| | QPSERVER |
|---|---|
| 58 | Constructor Methods: |
| 59 | public QPServer(QPSession session) throws QPException |
| 60 | public QPServer(QPSession session, QPCollectionEntry |
| 61 | severData) Throws QPException |
| 62 | Constructor for instantiating a Server object |
| 63 | from a Collection object. |
| 64 | Parameters: session - The QP Session object. |
| 65 | serverData - A QPCollectionEntry |
| 66 | containing server |
| 67 | information. |
| 68 | Variables: |
| 69 | public static final String SYSTEM_PLACE_NAME |

QPService 475

Public class QPService 475 extends QPBase 461. Its methods and variables are in Table 36.

TABLE 36

| | QPSERVICE |
|---|---|
| 1 | Methods: |
| 2 | public void init( ) throws QPException |
| 3 | Throws: exceptions |
| 4 | No exceptions thrown |
| 5 | public Node getMemberPlacesXML(String userDN, |
| 6 | Document doc) throws Exception, QPException |
| 7 | Get a user's QuickPlaces as an XML DOM tree. |
| 8 | |
| 9 | Parameters: userDN - the user's distinguished |
| 10 | name, in the form of a |
| 11 | search filter, e.g., |
| 12 | "dn=Bill Rodrick", "dn=B*". |
| 13 | doc - the parent DOM document |
| 14 | Returns: The resultant DOM tree. |
| 15 | public void createReplicas(String sourceServer, |
| 16 | String targetServer) throws QPException |
| 17 | |
| 18 | Throws: exceptions |
| 19 | No exceptions thrown |
| 20 | public void createReplicas(String sourceServer, |
| 21 | String targetServer, String place, boolean |
| 22 | bIsPlaceType) throws QPException |
| 23 | public void updatePlaceCatalog( ) throws QPException |
| 24 | public Node search(Node service, Document doc) |
| 25 | throws QPException |
| 26 | |
| 27 | Do the search against QuickPlace service. |
| 28 | public Node search(String searchString, String searchAuthor, |
| 29 | String searchDate, int searchDateType, int |
| 30 | searchOrder, int searchCount, in searchStart, int |
| 31 | searchType, Document doc) throws QPException |
| 32 | Do the search against QuickPlace service. |
| 33 | Returns: Node of QPSearchResult |
| 34 | public static int getSearchsort(String s) |
| 35 | public static String getSearchSort(int i) |
| 36 | public static int getSearchType(String s) |
| 37 | public static String getSearchType(int i) |
| 38 | public static String getSearchTypeAttributeValue(int i) |
| 39 | public static int getSearchDateType(String s) |
| 40 | public static String getsearchDateType(int i) |
| 41 | public static String getSearchDateTypeAttributeValue(int i) |
| 42 | public void trace(String s) |
| 43 | public Node reportAllservers(Document doc) throws Exception, |
| 44 | QPException |
| 45 | public Node reportAllPlaces(Document doc) throws Exception, |
| 46 | QPException |
| 47 | public Node reportPlacesByQuery(String queryString, Document |
| 48 | doc) throws Exception, QPException |
| 49 | public Node reportSpecifiedPlaces(Vector vPlaceNames, |
| 50 | Document doc) throws Exception, QPException |

TABLE 36-continued

| | QPSERVICE |
|---|---|
| 51 | Constructor Methods: |
| 52 | public QPService(QPSession session) throws QPException |
| 53 | Variables: |
| 54 | public static final String SYSTEM_PLACE_NAME |
| 55 | public static final int FT_SCORES |
| 56 | public static final int FT_DATE_ASC |
| 57 | public static final int FT_DATE_DES |
| 58 | public static final int FT_ANY_WORD |
| 59 | public static final int FT_ALL_WORD |
| 60 | public static final int FT_EXACT_WORD |
| 61 | public static final int FT_MODIFIED_BEFORE |
| 62 | public static final int FT_MODIFIED_AFTER |
| 63 | public static final int FT_MODIFIED_ON |

QPSession 480

Public class QPSession 480 extends QPBase 461. Its variables and methods are in Table 37.

TABLE 37

| | QPSESSION |
|---|---|
| 1 | Methods: |
| 2 | public QPServer getLocalServer( ) throws QPException |
| 3 | Get an instance of the local server. |
| 4 | public QPService getService( ) throws QPException |
| 5 | Get an instance of the service object. |
| 6 | public String getDistinguishedName( ) |
| 7 | throws IQPException |
| 8 | public boolean isSever( ) throws QPException |
| 9 | public boolean isServer( ) throws QPException |
| 10 | Constructor Methods: |
| 11 | public QPSession( ) throws QPException |
| 12 | QPSession create a server session. |
| 13 | public QPsession(String distinguishedName) |
| 14 | throws QPException |
| 15 | QPSession create a user session. |
| 16 | public QPSession(Node session) throws QPException |
| 17 | Variables: |

QPTheme 471

Public class QPTheme 471 extends QPBase 461. Its variables and methods are set forth in Table 38.

TABLE 38

| | QPTHEME |
|---|---|
| 1 | Methods: |
| 2 | Constructor Methods: |
| 3 | public QPTheme(QPPlace place, String name) |
| 4 | throws QPException |
| 5 | public static boolean isSystemThemeName(String themeName) |
| 6 | protected void addLayout(String layoutName) |
| 7 | throws QPException |
| 8 | protected void init( ) throws QPException |
| 9 | public QPPlace getPlace( ) |
| 10 | Gets the value of _place |
| 11 | Returns: the value of _place |
| 12 | public void setPlace(QPPlace arg_place) |
| 13 | Sets the value of _place |
| 14 | Parameters: art_place - Value to assign to |
| 15 | this._place |
| 16 | public String getName( ) |
| 17 | Gets the value of _name |
| 18 | Returns: the valueof _name |
| 19 | public void setName(String arg_name) |
| 20 | Sets the value of _name |

TABLE 38-continued

| | QPTHEME | |
|---|---|---|
| 21 | Parameters:  arg_name - | Value to assign to |
| 22 | | this._name |
| 23 | public Vector getLayouts( ) | |
| 24 | Gets the value of _layouts | |
| 25 | Returns: the value of _layouts | |
| 26 | public void setLayouts(Vector arg_layouts) | |
| 27 | Sets the value of _layouts | |
| 28 | Parameters:  arg_layouts - | Value to assign to |
| 29 | | this._layouts |
| 30 | public boolean isSystem( ) | |
| 31 | Gets the value of _bIsSystem | |
| 32 | Returns: the value of _bIsSystem | |
| 33 | public void setIsSystem(boolean arg_bIsSystem) | |
| 34 | Sets the value of _bIsSystem | |
| 35 | Parameters:  arg_bIsSystem - | Value to assign to |
| 36 | | this._bIsSystem |
| 37 | Variables: | |
| 38 | protected QPPlace _place | |
| 39 | protected String _name | |
| 40 | protected Vector _layouts | |
| 41 | protected boolean _bIsSystem | |

QPToc 476

Public class QPToc 476 extends QPBase 461. Its variables and methods are in Table 39.

TABLE 39

| | QPTOC |
|---|---|
| 1 | Methods: |
| 2 | public Vector getEntries( ) |
| 3 | public QPRoom getRoom( ) |
| 4 | public Node toXML(Document doc) throws QPException |
| 5 | Overrides: toXML in class QPBase |
| 6 | protected void addEntry(QPTocEntry entry) |
| 7 | throws QPException |
| 8 | |
| 9 | This is used by the native nInit call during load |
| 10 | protected void init( ) throws QPException |
| 11 | Constructor Methods: |
| 12 | public QPToc(QPRoom room) throws QPException |
| 13 | Variables: |
| 14 | protected QPRoom _room |
| 15 | protected Vector _entries |

QPTocEntry 477

Public class QPTocEntry 477 extends QPBase 461. Its variables and methods are set forth in Table 40.

TABLE 40

| | QPTOCENTRY | |
|---|---|---|
| 1 | Methods: | |
| 2 | public QPToc getToc( ) | |
| 3 | Gets the value of _toc | |
| 4 | Returns: the value of _toc | |
| 5 | public void setToc(QPToc arg_toc) | |
| 6 | Sets the value of _toc | |
| 7 | Parameters: arg_toc - Value to assign to this._toc | |
| 8 | public String getTitle( ) | |
| 9 | Gets the value of _title | |
| 10 | Returns: the value of _title | |
| 11 | public void setTitle (String arg_title) | |
| 12 | Sets the value of _title | |
| 13 | Parameters: arg_title - | Value to assign to |
| 14 | | this._title |
| 15 | public int getType( ) | |
| 16 | Gets the value of _type | |
| 17 | Returns: the value of _type | |
| 18 | public void setType(int arg_type) | |
| 19 | Sets the value of _type | |
| 20 | Parameters: arg_type - | Value to assign to |
| 21 | | this._type |
| 22 | public float getPosition( ) | |
| 23 | Gets the value of _position | |
| 24 | Returns: the value of _position | |
| 25 | public void setPosition(float arg_position) | |
| 26 | Sets the value of _position | |
| 27 | Parameters: arg_position - | Value to assign to |
| 28 | | this._position |
| 29 | public String getSystemName( ) | |
| 30 | Gets the value of _systemName | |
| 31 | Returns: the value of _systemName | |
| 32 | public void setSystemName(String arg_systemName) | |
| 33 | Sets the value of _systemName | |
| 34 | Parameters: arg_systemName - | Value to assign to |
| 35 | | this.systemName |
| 36 | public String getUnid( ) | |
| 37 | Gets the value of _unid | |
| 38 | Returns: the value of _unid | |
| 39 | public void setUnid(String arg_unid) | |
| 40 | Sets the value of _unid | |
| 41 | Parameters: arg_unid - | Value to assign to |
| 42 | | this._unid |
| 43 | public String getUrlPointer( ) | |
| 44 | Gets the value of _urlPointer | |
| 45 | Returns: the value of _urlPointer | |
| 46 | public void setUrlPointer(String arg_urlPointer) | |
| 47 | Sets the value of _urlPointer | |
| 48 | Parameters: arg_urlPointer - | kValue to assign to |
| 49 | | this._urlPointer |
| 50 | public boolean isOpenLinkInNewClientInstance( ) | |
| 51 | Gets the value of _openLinkInNewClientInstance | |
| 52 | Returns: the value of _openLinkInNewClientInstance | |
| 53 | public void setOpenLinkInNewClientInstance | |
| 54 | (boolean arg_openLinkInNewClientInstance) | |
| 55 | Sets the value of _openLinkInNewClientInstance | |
| 56 | Parameters: arg_openLinkInNewClientInstance - | |
| 57 | Value to assign to this | |
| 58 | ._openlinkInNewClientInstance | |
| 59 | public Object getObject( ) | |
| 60 | Gets the value of _object | |
| 61 | Returns: the value of _object | |
| 62 | public void setObject (Object arg_object) | |
| 63 | Sets the value of _object | |
| 64 | Parameters: arg_object - | Value to assign to |
| 65 | | this._object |
| 66 | protected void init( ) throws QPException | |
| 67 | public Node toXML(Document doc) throws QPException | |
| 68 | Overrides: toXML in class QPBase | |
| 69 | | |
| 70 | Constructor Methods: | |
| 71 | public QPTocEntry(QPToc toc) throws QPException | |
| 72 | Variables: | |
| 73 | protected QPToc _toc | |
| 74 | Pointer to the parent toc | |
| 75 | protected String _title | |
| 76 | protected int _type | |
| 77 | protected float _position | |
| 78 | protected String _systemName | |
| 79 | Only used by room links (room's system name) | |
| 80 | protected String _unid | |
| 81 | protected String _urlPointer | |
| 82 | Link page properties | |
| 83 | protected boolean _openLinkInNewClientInstance | |
| 84 | protected Object _object | |
| 85 | This is the "actual" object that represents this TOC | |
| 86 | entry, e.g. this wouldpoint to the room/folder/page | |
| 87 | objects | |

QPException

Public class QPException 464 extends java.lang.Exception 463, which in turn extends java.lang.Throwable 452, which in turn extends java.lang.Object 460. The methods and variables of QPException are provided in Table 41.

TABLE 41

QPEXCEPTION

| | |
|---|---|
| 1 | Methods: |
| 2 | public int getErrorCode( ) |
| 3 | public void setContext(String context) |
| 4 | public String getContext( ) |
| 5 | public String getLocalizedMessage( ) |
| 6 |     Overrides: getLocalizedMessage in class Throwable |
| 7 | public String getMessage( ) |
| 8 |     Overrides: getMessage in class Throwable |
| 9 | Constructor Methods: |
| 10 | public QPException(String s) |
| 11 |     Parameters:    s - java.lang.String |
| 12 | public QPException(int i) |
| 13 |     Parameters:    s - java.lang.String |
| 14 |         e - int |
| 15 | public QPException(int i, String s) |
| 16 |     Parameters:    s - java.lang.String |
| 17 |         e - int |
| 18 | Variables: |
| 19 | protected int i__iErrorCode |
| 20 | protected String I__context |
| 21 | public static final int kecUnitialized |

Referring to FIGS. 7–11, portions of the XML of Table 2 is set forth in diagrammatic form, providing a visualization of XML generated by an XMLSPY program.

Figure 7:
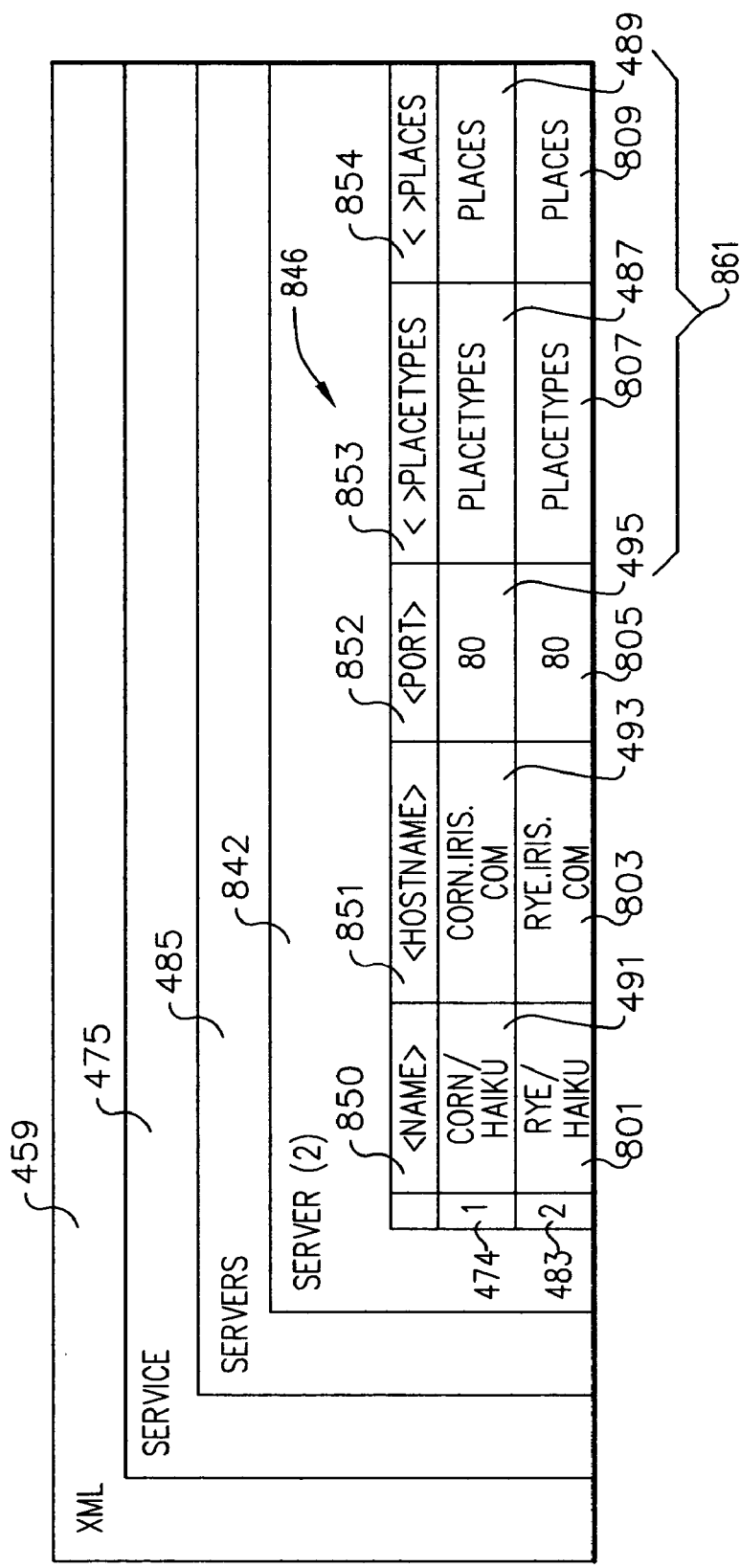
FIG. 7 is a graphical visualization of the XML rendition of the object model of the preferred embodiment of the invention set forth in Table 2.

Referring to FIG. 7, XML 459 corresponds to line 1 of Table 2; service 475 to line 3; servers 485 to line 4; and server 842 to line 5.

In the example of Table 2 (which is partially illustrated in FIG. 6), two servers 474, 483 are provided. Objects 846 of a server include name 850, hostname 851, port 852, placetypes 853, and places 854. A first server 474 is specified at lines 6,7 having name 491 at line 6, hostname 493 at line 7, port 495 at line 8, placetypes 487 at line 9, and places 489 at line 17. A second server 483 has its name 801 specified at line 138, hostname 803 at line 139, port 805 at line 140, placetypes 807 at line 141, and places 809 at line 151.

Figure 8:
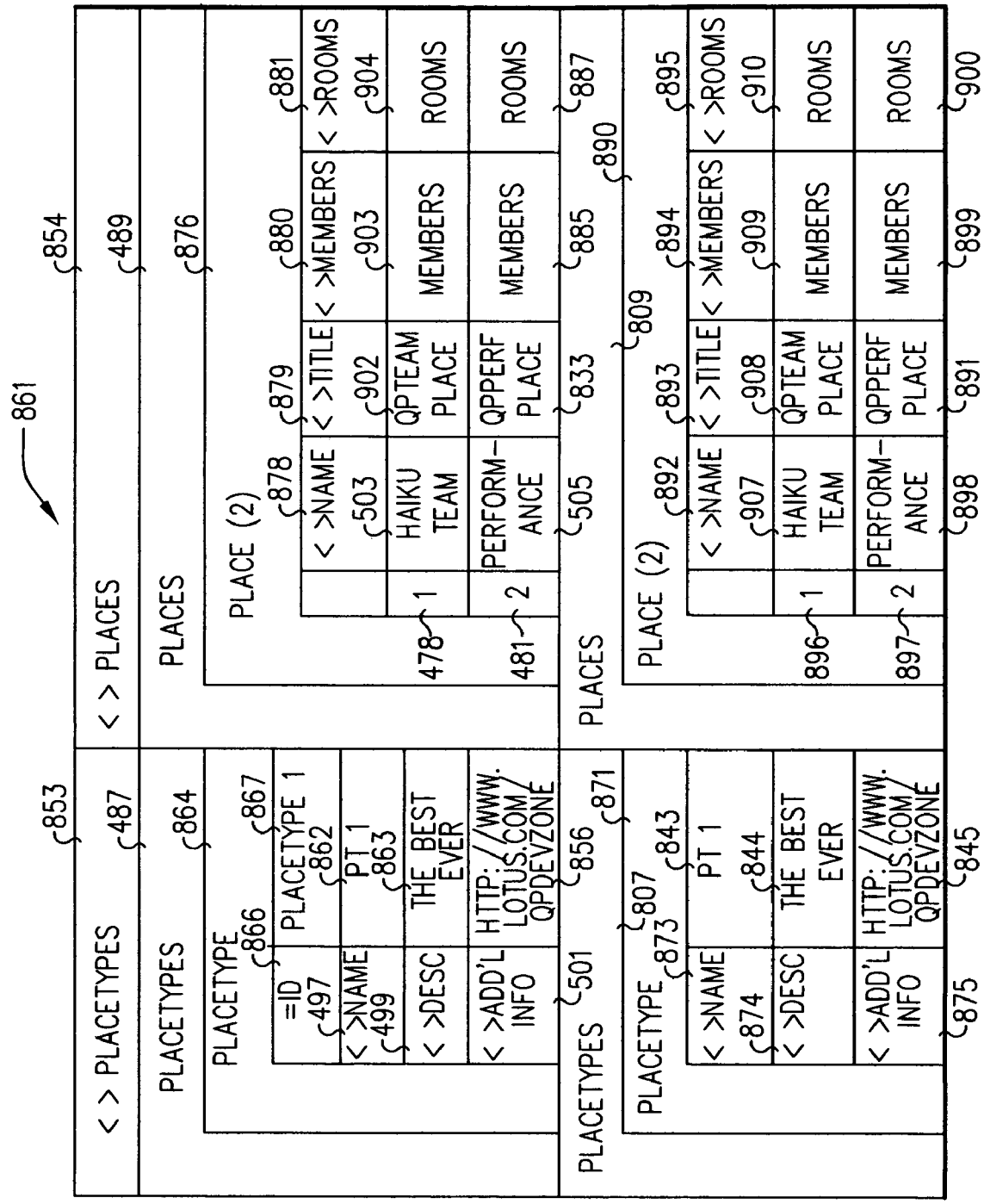
FIG. 8 is a graphical visualization in greater depth of placetypes and places objects in the XML of FIG. 7.

Referring to FIG. 8, elements 861 of FIG. 7 are represented in greater detail.

Attributes of place types 864 and 871 (an in FIG. 6, 479) include ID 866, name 497, 873, description 499, 874, and additional information 501, 875. For place type 864, its name 867 appears at line 10 of Table 2, its name 862 at line 11, its description 863 at line 12, and its additional information 856 at line 13. For place type 871, its name 843 appears at line 143, its description at line 144, and additional information 845 at line 147.

Attributes of places 876 include name 878, title 879, members 880 and rooms 881. Two places 478 and 481 are illustrated of placetype 864. Place 478 has its name 503 at line 19 of Table 2 (see also, FIG. 6), its title 902 at line 20, its members 903 specified at line 21, and its rooms 904 at line 35. Place 481 has its name 505 at line 99 (see also, FIG. 6), its title 883 at line 100, its members 885 at line 101, and its room 887 at line 112. Two places 890 of placetype 871 are illustrated. The attributes of these places include name 892, title 893, members 894 and room 895. Place 896 has name 907 corresponding to line 153 of Table 2, title 908 at line 154, members 909 at line 155, and rooms 910 at line 169. Place 897 has name 898 given at line 193, title 891 at line 194, members 899 at line 195, and rooms 900 at line 206.

Figure 9:
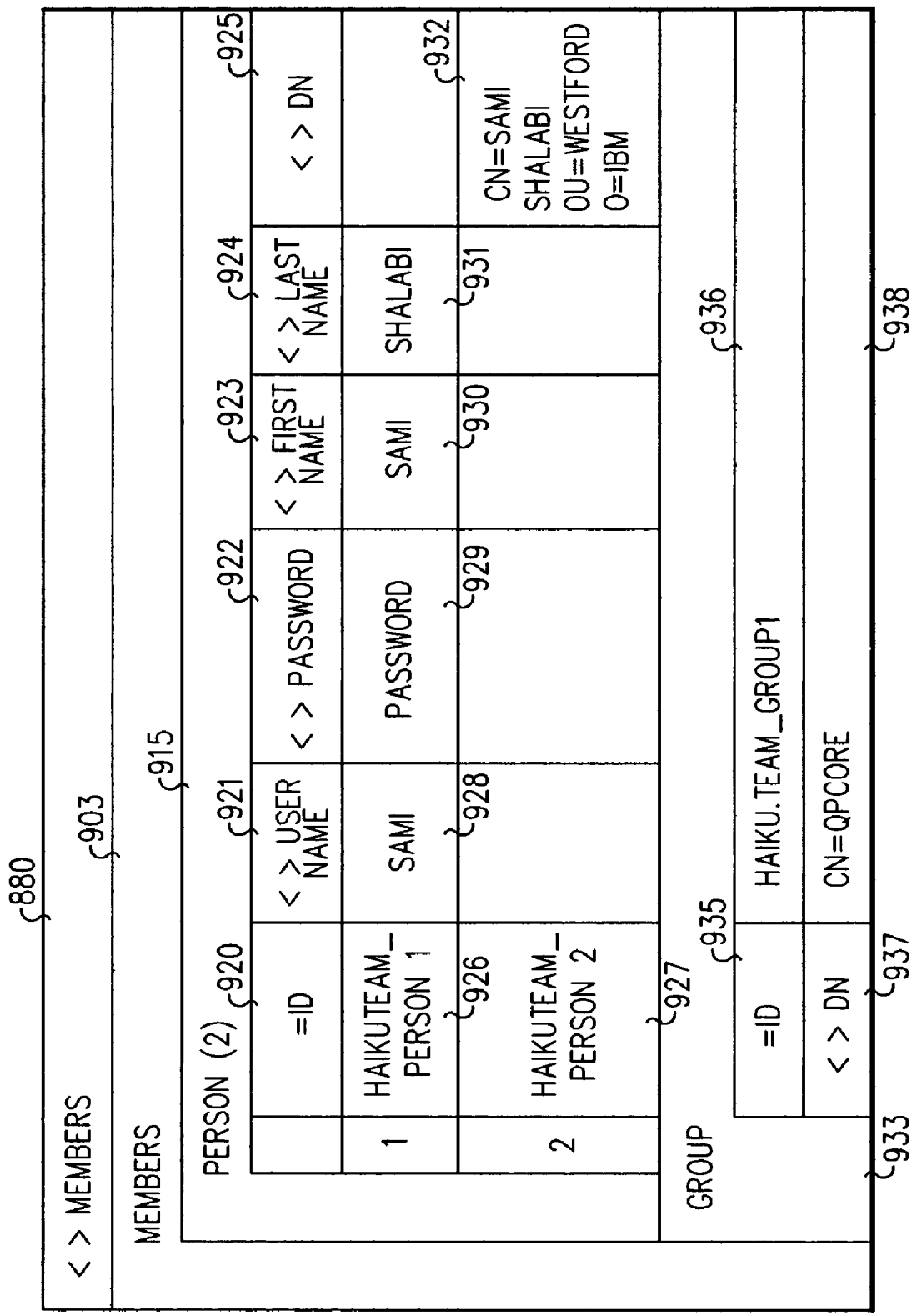
FIG. 9 is a graphical visualization in greater depth of a first members object in the XML of FIG. 8.

Referring to FIG. 9, the XML of members 880, 903 of FIG. 8 is expanded. Members 880 of place 876 include two persons 915 and a group 933. Attributes of persons 915 include ID 920, user name 921, password 922, first name 923, last name 924, and distinguished name (DN) 925. A first person is specified by ID 926 at line 22, user name 928 at line 23, password 929 at line 24, first name 930 at line 25, last name 931 at line 26; and a second person by ID 927 at line 28 and DN 932 at line 29. A group 933 has as attributes ID 935 and DN 937. In these instance, a group of ID 936 at line 31 of Table 2 has its DN 938 at line 32.

Figure 10:
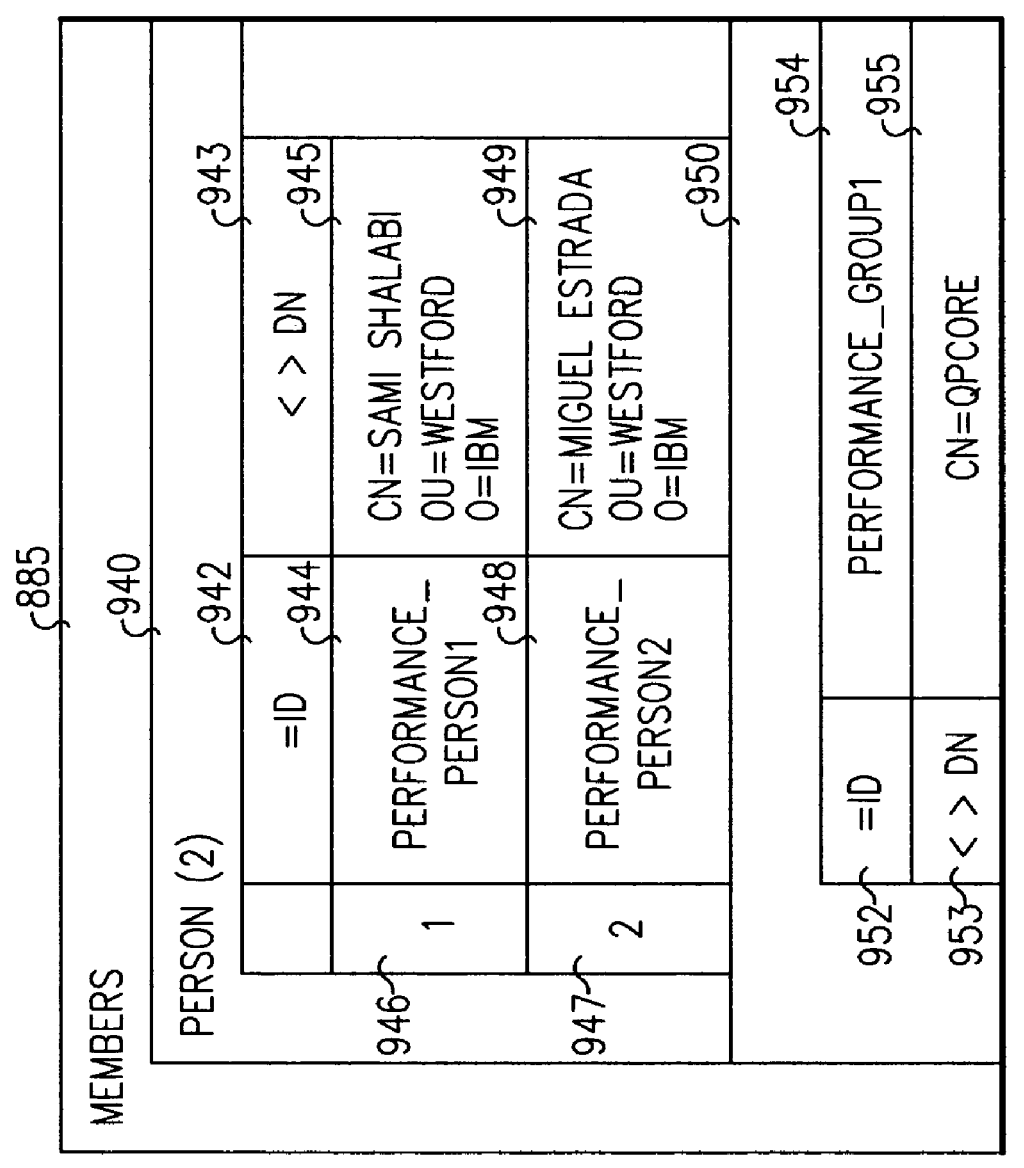

Referring to FIG. 10, the XML of members 885 of FIG. 8 is expanded. Members of place 481 include two persons 940 (946, 947) and a group 950. Persons 940 attributes include ID 942 and DN 943, and group attributes include ID 952 and DN 953. For person 946, ID 944 is given at line 102 of Table 2, and DN 945 at line 103. For person 947, ID 948 is given at line 105 and DN 949 at line 106. For group 950, ID 954 is at line 108, and DN 955 is at line 109.

Referring to FIG. 11, the XML of rooms 904 of FIG. 8 is expanded. Each room 956 has attributes name 957 and access 958. Rooms 904 expand into three rooms 956 in three NSF files, 961 at line 37 of Table 2, 962 at line 57, and 963 at line 77. Access 958 of room 961 is at line 38 of Table 2, access 977 of room 962 is at line 977, and access 978 of room 963 at line 78.

Main.nsf 961 has access 959 by managers 964 at line 39, authors 969 at line 44, and readers 973 at line 49. Pagelibrary.nsf 962 has access 977 by managers 979 at line 59, authors 984 at line 64, and readers 989 at line 69. Pagelibrary2.nsf has access 978 by managers 992 at line 79, authors 996 at line 84, and readers 1001 at line 89. Members 965, 970, 974, 980, 985, 987, 993, 997, and 1002 for the respective managers, authors, and readers have links 966, 971, 975, 981, 986, 990, 994, 998, and 1003, respectively, illustrated at ID reference 967, 960, 911, 913, 906, 912, 914, 916, and 905 for member 968 at line 41, 972 at line 46, 976 at line 51, 983 at line 61, 988 at line 66, 991 at line 71, 995 at line 81, 999 at line 86, and 10004 at line 91.

FIGS. 7–11 show how an XML tree, such as that of Table 2, may be built to illustrate an entire organization across a plurality of servers 101 in a service 100.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical tape or disc, or the like, for at least momentarily fixing signals, wherein the memory device is readable by a machine, for controlling the operation of a computer according o the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for representing data on place objects in a distributed environment with single point administration on a service provided with meta data needed for acting upon and aiding administration, comprising:
   instantiating a plurality of servers in said environment, said environment including said service providing centralized access control list (ACL) protection at said single point for access check for a plurality of service providers;
   instantiating a service catalog to include indicia cataloging a plurality of place objects as nodes on a tree including said plurality of servers within said distributed environment;
   generating from said service catalog a document file encapsulating cataloged relationships of server objects in said distributed environment;
   traversing said tree to generate from said place objects a document file of object attributes; and
   generating from said document file reports including said object attributes.

2. The method of claim 1, further comprising instantiating a service object as a plurality of server objects which are in a same address domain, share a same user directory and authentication system, are on a same user network, and are administered by a single administration team.

3. The method of claim 2, further comprising:
   selectively exporting to a further distributed environment data from said document file.

4. System for representing data on place objects in a distributed environment, comprising:
   a plurality of server objects instantiated in said environment in a same address domain, which share a same user directory and authentication system, are on a same user network, and are administered by a single administration team;
   a service catalog cataloging a plurality of place objects as nodes on a tree including said plurality of servers objects within said distributed environment;
   a document file encapsulating cataloged relationships of server objects in said distributed environment and storing object attributes generated by traversing said tree;
   means for instantiating nodes on said tree to include a project base node, and extending said project base node to member, room, server, service, table of contents, and place inheritance nodes.

5. The system of claim 4, further comprising means for instantiating nodes on said tree to include group and person inheritance nodes extending said member inheritance node.

6. System for representing data on place objects in a distributed environment with single point administration on a service provided with meta data needed for acting upon and aiding administration, comprising:
   a plurality of server objects instantiated in said environment in a same address domain, which share a same user directory and authentication system, are on a same user network, and are administered by a single administration team, said environment including said service providing centralized access control list (ACL) protection at said single point for access check for a plurality of service providers;
   a service catalog cataloging a plurality of place objects as nodes on a tree including said plurality of servers objects within said distributed environment; and
   a document file encapsulating cataloged relationships of server objects in said distributed environment and storing object attributes generated by traversing said tree.

7. The system of claim 6, further comprising:
   means for selectively exporting to a further distributed environment data from said document file.

8. A program storage device readable by a machine, tangibly embodying a program of instructions executable by a machine to perform method steps for representing data on place objects in a distributed environment with single point administration on a service provided with meta data needed for acting upon and aiding administration, said method comprising:
   instantiating a plurality of servers in said environment, said environment including said service providing centralized access control list (ACL) protection at said single point for access check for a plurality of service providers;
   instantiating a service catalog to include indicia cataloging a plurality of place objects as nodes on a tree including said plurality of servers within said distributed environment;
   generating from said service catalog a document file encapsulating cataloged relationships of server objects in said distributed environment;
   traversing said tree to generate from said place objects a document file of object attributes; and
   generating from said document file reports including said object attributes.

9. The program storage device of claim 8, said method further comprising:
   instantiating a service object as a plurality of server objects which are in a same address domain, share a same user directory and authentication system, are on a same user network, and are administered by a single administration team.

10. The program storage device of claim 9, said method further comprising:
    selectively exporting to a further distributed environment data from said document file.

11. Method for representing data on place objects in a distributed environment, comprising:
    instantiating a plurality of servers in said environment;
    instantiating a service catalog to include indicia cataloging a plurality of place objects as nodes on a tree including said plurality of servers within said distributed environment;
    generating from said service catalog a document file encapsulating cataloged relationships of server objects in said distributed environment;
    traversing said tree to generate from said place objects a document file of object attributes;
    generating from said document file reports including said object attributes;
    instantiating a service object as a plurality of server objects which are in a same address domain, share a same user directory and authentication system, are on a same user network, and are administered by a single administration team; and
    instantiating nodes on said tree to include a project base node, and extending said project base node to member, room, server, service, table of contents, and place inheritance nodes.

12. The method of claim 11, further comprising instantiating nodes on said tree to include group and person inheritance nodes extending said member inheritance node.

13. A program storage device readable by a machine, tangibly embodying a program of instructions executable by a machine to perform method steps for representing data on place objects in a distributed environment, said method comprising:

instantiating a plurality of servers in said environment;

instantiating a service catalog to include indicia cataloging a plurality of place objects as nodes on a tree including said plurality of servers within said distributed environment;

generating from said service catalog a document file encapsulating cataloged relationships of server objects in said distributed environment;

traversing said tree to generate from said place objects a document file of object attributes;

generating from said document file reports including said object attributes;

instantiating a service object as a plurality of server objects which are in a same address domain, share a same user directory and authentication system, are on a same user network, and are administered by a single administration team; and instantiating nodes on said tree to include a project base node, and extending said project base node to member, room, server, service, table of contents, and place inheritance nodes.

14. The program storage device of claim 13, said method further comprising instantiating nodes on said tree to include group and person inheritance nodes extending said member inheritance node.

* * * * *